(12) United States Patent
Mullick et al.

(10) Patent No.: US 10,572,469 B2
(45) Date of Patent: Feb. 25, 2020

(54) VERSIONING AND NON-DISRUPTIVE SERVICING OF IN-MEMORY UNITS IN A DATABASE

(71) Applicant: Oracle International Corporation, Redwood Shores, CA (US)

(72) Inventors: Atrayee Mullick, Cupertino, CA (US); Niloy Mukherjee, Belmont, CA (US); Sanket Hase, Mountain View, CA (US); Tirthankar Lahiri, Palo Alto, CA (US); Juan Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 634 days.

(21) Appl. No.: 15/169,013

(22) Filed: May 31, 2016

(65) Prior Publication Data
US 2017/0344593 A1 Nov. 30, 2017

(51) Int. Cl.
*G06F 17/30* (2006.01)
*G06F 16/23* (2019.01)
(Continued)

(52) U.S. Cl.
CPC ...... *G06F 16/2329* (2019.01); *G06F 11/1446* (2013.01); *G06F 11/1451* (2013.01);
(Continued)

(58) Field of Classification Search
CPC ............ G06F 11/1446; G06F 2201/80; G06F 17/30368; G06F 17/30356; G06F 17/3023;
(Continued)

(56) References Cited

U.S. PATENT DOCUMENTS 4,782,325 A 11/1988 Jeppsson et al.
5,742,792 A 4/1998 Yanai et al.
(Continued)

FOREIGN PATENT DOCUMENTS

EP 2 608 070 A1 6/2013
GB 1 332 631 A 10/1973
WO WO2007/078444 A1 7/2007

OTHER PUBLICATIONS

U.S. Appl. No. 14/337,183, filed Jul. 21, 2014, Office Action, dated Jan. 13, 2015.
(Continued)

*Primary Examiner* — Ashish Thomas
*Assistant Examiner* — Suman Rajaputra
(74) *Attorney, Agent, or Firm* — Hickman Palermo Becker Bingham LLP

(57) ABSTRACT

Techniques for non-disruptive versioning of in-memory units in a database are provided. A database server generates and maintains a first IMU that reflects changes made to a mirrored-data-set up to a first snapshot time, and a second IMU that reflects changes made to the mirrored-data-set up to a second snapshot time. During a first period, the database server responds to updates to first data items in the mirrored data by storing first staleness metadata that indicates that the copies of the first data items in the first IMU are stale. During a second period, the database server responds to updates to second data items in the mirrored data by storing second staleness metadata that indicates that the copies of the second data items in the second IMU are stale. The database server responds to a request by accessing the first IMU or the second IMU.

26 Claims, 10 Drawing Sheets

(51) Int. Cl.
  *G06F 16/11* (2019.01)
  *G06F 16/18* (2019.01)
  *G06F 11/14* (2006.01)

(52) U.S. Cl.
  CPC ........ *G06F 16/128* (2019.01); *G06F 16/1873* (2019.01); *G06F 16/2358* (2019.01); *G06F 2201/80* (2013.01); *G06F 2201/84* (2013.01)

(58) Field of Classification Search
  CPC ........... G06F 17/30578; G06F 11/1451; G06F 2201/84; G06F 17/3048; G06F 17/30569; G06F 17/30; G06F 17/30067; G06F 17/30575; G06F 17/30286; G06F 17/30008
  See application file for complete search history.

(56) References Cited

U.S. PATENT DOCUMENTS

| | | | |
|---|---|---|---|
| 5,778,430 | A | 7/1998 | Ish et al. |
| 5,870,759 | A | 2/1999 | Bauer et al. |
| 6,009,432 | A | 12/1999 | Tarin |
| 7,149,769 | B2 | 12/2006 | Lubbers et al. |
| 8,433,684 | B2 | 4/2013 | Munoz |
| 8,856,484 | B2 | 10/2014 | Ben-Tsion et al. |
| 9,292,564 | B2 | 3/2016 | Kamp et al. |
| 2005/0055380 | A1 | 3/2005 | Thompson et al. |
| 2005/0165798 | A1 | 7/2005 | Cherkauer et al. |
| 2006/0173833 | A1 | 8/2006 | Purcell et al. |
| 2007/0156957 | A1 | 7/2007 | MacHardy et al. |
| 2008/0059492 | A1 | 3/2008 | Tarin |
| 2008/0256250 | A1 | 10/2008 | Wakefield et al. |
| 2008/0281784 | A1 | 11/2008 | Zane et al. |
| 2008/0281865 | A1 | 11/2008 | Price et al. |
| 2009/0307290 | A1 | 12/2009 | Barsness et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0138123 | A1 | 6/2011 | Aditya et al. |
| 2012/0173515 | A1 | 7/2012 | Jeong et al. |
| 2012/0323971 | A1 | 12/2012 | Pasupuleti |
| 2013/0060742 | A1 | 3/2013 | Chang |
| 2014/0040218 | A1 | 2/2014 | Kimura et al. |
| 2014/0075493 | A1 | 3/2014 | Krishnan et al. |
| 2014/0281131 | A1* | 9/2014 | Joshi ................. G06F 12/0804 711/103 |
| 2015/0088811 | A1 | 3/2015 | Hase et al. |
| 2015/0088822 | A1* | 3/2015 | Raja ................... G06F 16/2365 707/625 |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2016/0085834 | A1 | 3/2016 | Gleeson et al. |
| 2016/0350363 | A1 | 12/2016 | Raja et al. |

OTHER PUBLICATIONS

U.S. Appl. No. 14/337,183, filed Jul. 21, 2014, Notice of Allowance, dated Apr. 24, 2015.
U.S. Appl. No. 14/337,182, filed Jul. 21, 2014, "Office Action", dated Jan. 26, 2015.
U.S. Appl. No. 14/337,182, filed Jul. 21, 2014, Notice of Allowance, dated Jan. 21, 2016.
U.S. Appl. No. 14/337,182, filed Jul. 21, 2014, Interview Summary, dated Sep. 15, 2015.
U.S. Appl. No. 14/337,182, filed Jul. 21, 2014, Interview Summary, dated May 8, 2015.
U.S. Appl. No. 14/337,182, filed Jul. 21, 2014, Final Office Action, dated Jul. 17, 2015.
U.S. Appl. No. 14/337,182, filed Jul. 21, 2014, Advisory Action, dated Oct. 5, 2016.
U.S. Appl. No. 14/337,179, filed 074/21/2014, Notice of Allowance, dated Jul. 29, 2015.
U.S. Appl. No. 14/337,179, filed Jul. 21, 2014, Office Action, dated Dec. 29, 2014.
U.S. Appl. No. 14/337,179, filed Jul. 21, 2014, Notice of Allowance, dated Nov. 3, 2015.
U.S. Appl. No. 14/337,179, filed Jul. 21, 2014, Interview Summary, dated Jun. 17, 2015.
U.S. Appl. No. 14/337,179, filed Jul. 21, 2014, Final Office Action, dated Apr. 10, 2015.
Zhang Ho et al., "In-Memory Big Data", Management and Processing: A Survery, IEEE, vol. 27, No. 7, dated Jul. 1, 2015, pp. 1920-1948.
Alfons Kemper et al., "Hyper: A Hybrid OLTP&OLAP Main Memory Database System Based on Virtual Memory Snapshots", Data Engineering (ICDE), dated Apr. 11, 2011, IEEE, pp. 195-206.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", Business Intelligence for the real-time Enterprise, dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Dec. 2011, vol. 40, No. 4, 8 pages.
Raja, U.S. Appl. No. 14/983,481, filed Dec. 29, 2015, Notice of Allowance, dated May 1, 2018.

\* cited by examiner

VERSIONING AND NON-DISRUPTIVE SERVICING OF IN-MEMORY UNITS IN A DATABASE

FIELD

Embodiments described herein relate generally to database systems and, more specifically, to techniques related to generating and maintaining multiple versions of an in-memory database object that mirrors data that resides in persistent storage in another format.

BACKGROUND

It is common for database systems to store data persistently in disk blocks. Typically, within each disk block, data is arranged in row-major format. That is, the values of all columns of one row are followed by the values of all columns for the next row. To speed up performance, some of the disk blocks may be cached in a buffer cache within volatile memory. Accessing the data from volatile memory is significantly faster than accessing the data from disk. However, even within the volatile memory, the data is still in the format of row-major disk blocks, which is not optimal for certain types of database operations.

In contrast to row-major disk blocks, columnar formats have many attractive advantages for query processing in memory, such as cache locality and compression. Consequently, some database servers now employ new table types for persistently storing data in column-major formats. When column-major format data is read into volatile memory, it can be used to process certain queries more efficiently than would be possible if the data were stored in row-major disk blocks.

Rather than load individual data items on a per-item basis, entire database objects, or portions thereof, may be pre-loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance", filed Jul. 21, 2014, (the "Mirroring Application), the contents of which are incorporated herein in its entirety. This application describes storing database objects, or portions thereof, in volatile memory in a different format than the format that those same objects have on disk. For example, the in-memory copies of the objects may be stored in a column-major format, while the persistent copies are stored in a row-major format. Queries that are most efficiently processed using row-major data may use the persistent copies, and queries that are most efficiently processed using column-major data may use the in-memory copies.

When multiple copies of a data set are maintained and used to respond to a database request, the database server must ensure that transactional consistency is maintained. For example, a when a copy of a particular item is updated in the persistent data set as part of a database transaction, the database server may maintain transactional consistency by also updating the particular item in the in-memory data as part of the same transaction. When the in-memory data and the persistent data are transactionally synchronized, the result set of a query will be the same regardless of whether the query was processed using data items obtained from the in-memory data or the persistent data.

Unfortunately, this technique does not work well due to the lag that occurs between replicated systems. Specifically, at any given point in time, some changes made at one of the replicas will not yet have been applied to the other replica. Consequently, the lag inherent in the replication mechanism may result in unpredictable artifacts and, possibly, incorrect results. Furthermore, it may be expensive to keep the in-memory data up to date with all changes being made to the persistent data. For example, the in-memory data may be in a compressed format that would require an entire set of columnar data to be decompressed to perform any corresponding update.

Another technique, used in Oracle Database In-Memory (DBIM), stores in-memory columnar units (IMCU). IMCUs are snapshots of the underlying data as of a point in time and their accesses are most suited for analytic queries. Any DML activity (e.g. insert, update or delete of row/s) gets recorded as an invalidation row within the unit, thereby avoiding the processing overhead and memory consumption of synchronization. A query scanning the IMCU retrieves valid data from the IMCU and gets rows corresponding to the invalidation records from a source other than the IMCU. The other source may be, for example, an in-memory journal for the IMCU, blocks cached in the buffer cache, or blocks retrieved from disk. As the number of invalid rows within the IMCU increases, the more frequently the database must retrieve items from sources other than the IMCU. Such out-of-IMCU item retrievals increase the scan latency of the IMCU. Eventually, the IMCU may contain so many invalid items that it is no longer efficient to perform scans using the IMCU. To avoid this condition, IMCUs may be rebuilt or repopulated with valid data when the number of invalidations crosses a threshold.

After an IMCU is rebuilt, all the data is valid as of a second point in time. However, IMCU repopulation is a time-intensive process during which the IMCU is unavailable. That is, an existing IMCU is first marked offline for queries before its repopulation is commenced. The new IMCU is made available to queries only when the repopulation procedure completes. The unavailability of the IMCU during repopulation means that all items contained therein (whether or not invalid) must be retrieved from another source, such as persistent data blocks, even if accessing the other source is less efficient. This results in regression of scan latency over a non-trivial window of time. The regression worsens when multiple queries are concurrently issued on the same table, as each of these queries gets affected by the unavailability of the IMCU. In an intensive Online Transaction Analytical Processing (OLTAP) environment, heavy DML activity causing updates to the underlying data may require a corresponding IMCU to undergo frequent repopulations. This will result in unavailability of an IMCU for a substantial number of queries, thereby affecting performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
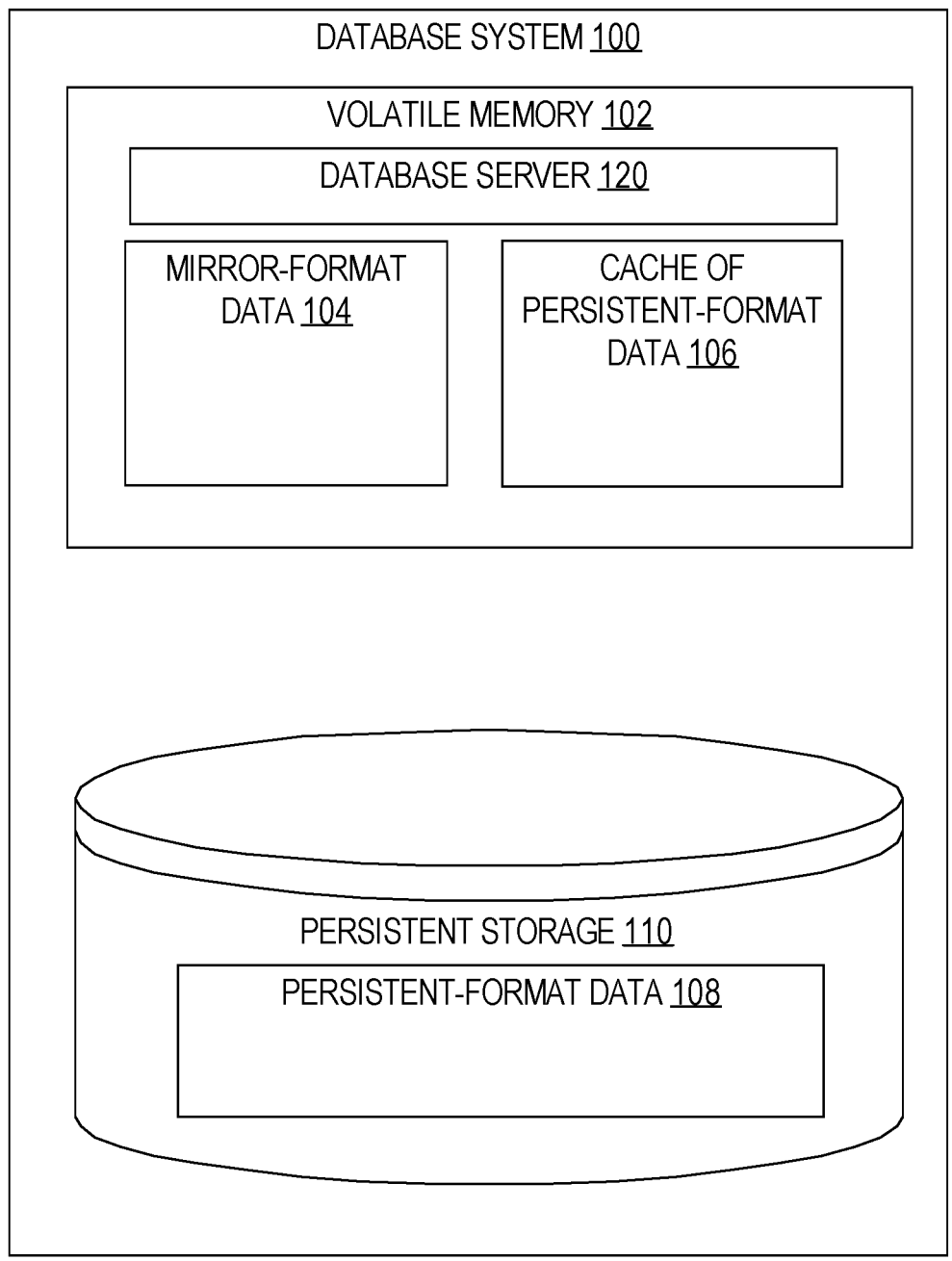
FIG. 1 is a block diagram of a database system that concurrently maintains mirror-format data in volatile memory and persistent-format data in persistent storage, according to an embodiment.

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

A set of data whose items are both (a) stored on persistent storage in one format, and (b) stored in volatile memory in another format, is referred to herein as a "mirrored-data-set". An in-memory version of a mirrored-data-set is referred to herein as an in-memory unit or "IMU". Techniques are described herein for generating, maintaining, and using multiple IMUs for a single mirrored-data-set. That is, rather than maintaining a single in-memory copy of the mirrored-data-set, multiple in-memory copies are maintained for the same mirrored-data-set. The IMUs of a mirrored-data-set are collectively referred to herein as the "in-memory-group" of the mirrored-data-set.

Each IMU in an in-memory-group includes a copy of each data item of the mirrored-data-set associated with the in-memory-group. For example, assume that a particular mirrored-data-set includes columns A, B and C of a table T. Under these circumstances, the in-memory-group for that mirrored-data-set would include one or more IMUs, each of which would include all items from columns A, B and C of table T.

In some embodiments, each IMU in an in-memory-group has a corresponding snapshot time. The snapshot time of an IMU indicates that time at which the copies of the data items in the IMU were up-to-date. That is, the copies of the data items in a particular IMU reflect all changes that had been made and committed to those data items as of the snapshot time. Stated another way, each IMU is a snapshot image of its mirrored-data-set as of the corresponding snapshot time.

In some embodiments, at any given time, one IMU of a mirrored-data-set is designated to be the "current IMU" of the mirror data set. For example, a first IMU may be designated the current IMU of mirrored-data-set X for a first period of time, such as until it is determined that the in-memory data should be repopulated. When repopulation is performed, a second IMU of mirrored-data-set X is generated and becomes the current IMU of mirrored-data-set X.

In some embodiments, when an IMU is the current IMU, staleness metadata is stored in association with the IMU. The staleness metadata for a particular IMU identifies data items in the particular IMU that have been updated during the corresponding period. During a current period, when a data item in the mirrored-data-set is updated, staleness metadata may be stored in association with the current IMU to indicate that the copy of the data item in the current IMU is stale, and is no longer synchronized with the persistent copy of the data item.

When multiple IMUs of a mirrored-data-set are maintained, one or more non-current IMUs may be used by the database server to process a query even if the current IMU is unavailable, such as when the current IMU is being repopulated. According to one embodiment, the database server determines the appropriate data source to access to execute a query based, at least in part, on (a) a target snapshot time associated with the query, and (b) snapshot times associated with the available IMUs.

For example, if the target snapshot time of the request falls in a period corresponding to a specific IMU, then the specific IMU and its staleness metadata may be used to respond to the request. If the staleness metadata indicates particular data items are stale in the specific IMU, then the database server may access an up-to-date version of those particular data items from another source, such as but not limited to one or more persistent data blocks, a buffer cache, a transaction journal, and/or another transaction record. Thus, maintaining an in-memory-group allows the database server to use an IMU to accurately respond to a query, even if the target snapshot time is before the generation of the current IMU of the mirrored-data-set.

General Architecture

FIG. 1 is a block diagram of a database system according to some embodiments. Referring to FIG. 1, database system 100 includes volatile memory 102 and persistent storage 110. Volatile memory 102 generally represents the random access memory used by the database system, and may be implemented by any number of memory devices. Typically, data stored volatile memory 102 is lost when a failure occurs.

Persistent storage 110 generally represents any number of persistent storage devices, such as magnetic disks, FLASH memory, and/or solid state drives. Unlike volatile memory 102, data stored in persistent storage 110 is not lost when a failure occurs. Consequently, after a failure, the data in persistent storage 110 may be used to repopulate the data that was lost in volatile memory 102.

Within volatile memory 102, a database server 120 executes database commands that are submitted to the database server by one or more database applications (not shown). Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to one or more databases, processing requests by clients to access the one or more databases.

The database server maintains, in persistent storage 110, persistent-format data 108. Persistent-format data 108 resides in persistent storage device 110. The persistent-format data 108 may include, for example, row-major disk blocks. While row-major disk blocks are used for the purposes of illustration, the persistent-format structures may take any form, such as column-major disk block, hybrid compression units (where some data is arranged in column-major format and other data is arranged in row-major format), another format, or any combination thereof.

In some embodiments, the volatile memory 102 further includes a cache 106 of persistent-format data. Within the cache 106, the data is stored in a format that is based on the format in which the data resides within the persistent-format data 108. For example, if the persistent-format is row-major disk blocks, then cache 106 may contain cached copies of row-major disk blocks. For example, the cache 106 may include a copy of a portion of the persistent-format data 108 that is current as of a particular time, such as one or more disk blocks of in persistent storage 110.

On the other hand, mirror-format data 104 is in a format that is unrelated to the persistent-format. For example, in the case where the persistent-format is row-major disk blocks, the mirror-format may be column-major compression units. Because the mirror-format differs from the persistent-format, the mirror-format data 104 is produced by performing transformations on the persistent-format data. These transformations occur both when volatile memory 102 is initially populated with mirror-format data 104 (whether at start-up or on-demand), and when volatile memory 102 is re-populated with mirror-format data 104 either periodically or after a failure.

Significantly, the existence of mirror-format data 104 may be transparent to the database applications that submit database commands to the database server that makes use of the mirror-format data 104. For example, those same applications, designed to interact with database systems that operate exclusively in persistent-format data 108, may interact without modification with a database server that maintains mirror-format data 104 in addition to the persistent-format data 108. Further, transparent to those applications, that database server may use the mirror-format data 104 to more efficiently process some or all of those database commands. Because mirror-format data 104 is merely a mirror of some of the persistent-format data (albeit in a different format), all data items contained in mirror-format data 104 are also in the persistent-format data. Therefore, for any query that requires access to data items in a mirrored-data-set, the database server has the choice of obtaining that data from mirror-format data 104, from the persistent-format data, or partially from the mirror-format data 104 and partially from the persistent-format data.

Mirror-format data 104 may mirror all of the persistent-format data 108, or a subset thereof. In some embodiments, a user may specify what portion of the persistent-format data 108 is mirrored. The specification of the mirrored-data-set may be made at any level of granularity, and one or multiple mirrored-data-sets may be specified. As used herein, the term "level" refers to a level of granularity. For example, the specification of what persistent-format data 108 is mirrored may be made at least at the following levels of granularity:

the entire database
specified tables
specified columns
specified row ranges
specified partitions
specified segments
specified extents
any combination thereof (e.g. specified columns and partitions)

As shall be described hereafter, mirrored data is converted to the mirror-format and stored as mirror-format data 104 in volatile memory. Thus, when mirrored data is required by a query, the database server has the option of providing the data from either the persistent-format data 108 or the mirror-format data 104. The conversion and loading may occur at the time the database is started, or in a lazy or on-demand fashion. When data that is not mirrored is required by a query, the database server does not have the option of obtaining the data from the mirror-format data 104.

Mirror-Format Data

Figure 2A:
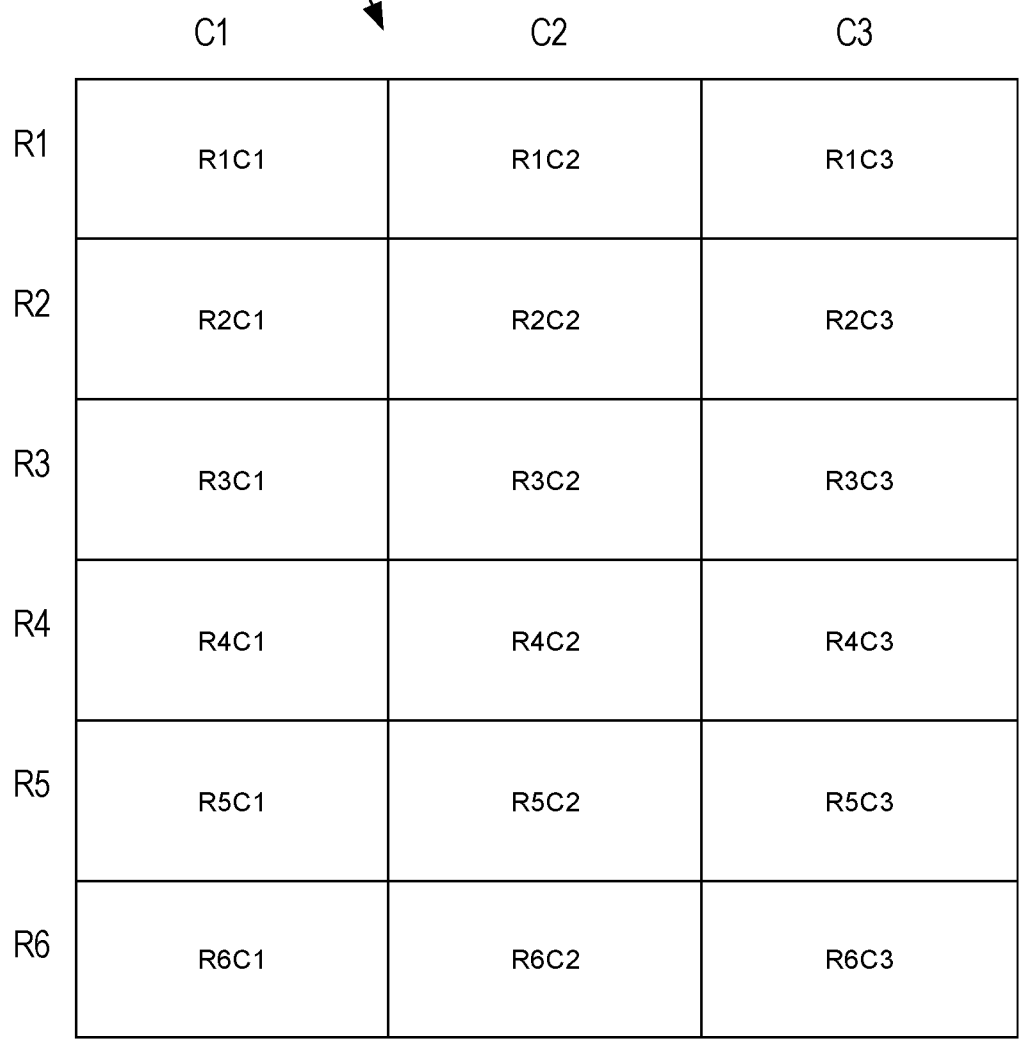
FIG. 2A is a block diagram of a table used for examples.

For the purpose of explanation, it shall be assumed that the database managed by database system 100 includes include the table 200 illustrated in FIG. 2A. Table 200 includes three columns C1-C3, and six rows R1-R6. While the illustration of table 200 in FIG. 2A portrays how the data is logically organized, the actual format in which the data is physically stored may be quite different.

Figure 2B:
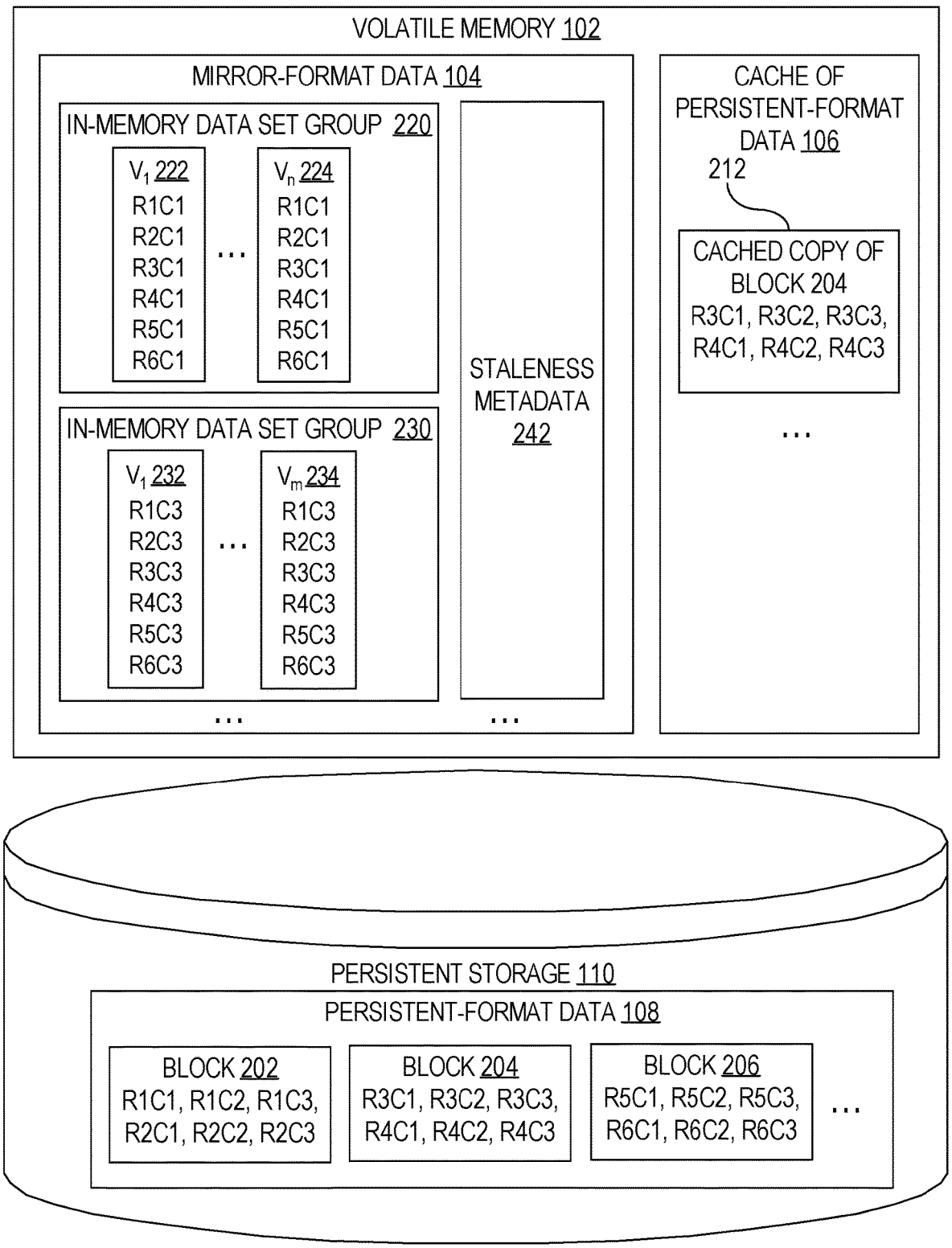
FIG. 2B is a block diagram of how copies of data items in a mirrored data set may be concurrently maintained in a persistent data set and one or more groups of in-memory versions of a mirrored data set, according to an embodiment.

FIG. 2B illustrates an embodiment of how the data that resides in table 200 may be physically organized in database system 100. In the present example, the data for table 200 is stored in three row-major disk blocks 202, 204 and 206. Block 202 stores the values for all columns of row R1, followed by the values for all columns of row R2. Block 204 stores the values for all columns of row R3, followed by the values of all columns of row R4. Finally, block 206 stores the values of all columns of row R5, followed by the values of all columns of row R6.

Copies of some of those disk blocks may be temporarily stored in cache 106. In the example illustrated in FIG. 2B, a cached copy 212 of block 204 resides in cache 106. Cache 106 may be managed using any one of a variety of cache management techniques, and the embodiments described herein are not limited to any particular cache management technique. In general, such techniques attempt to retain in volatile memory 102 copies of the disk blocks that are most likely to be requested in the near future. Consequently, when cache 106 runs out of space, cached copies of disk blocks that are less likely to be requested are replaced by copies of blocks that are more likely to be requested.

In contrast to the data in cache 106, the mirror-format data 104 is not formatted in a manner that is based on the persistent-format. The mirror-format data 104 may be maintained for all or a subset of database objects stored in the database, and/or any portion thereof. For example, mirror-format data 104 may be maintained for one or more partitions and/or columns of a table.

In the illustrated example, only columns C1 and C3 of table 200 are mirrored, so only the data appearing in columns C1 and C3 are stored in mirror-format data 104. In this case, the mirror-format data 104 mirrors a subset of the persistent-format data 108 because mirror-format data 104 does not include column vectors for column 2 of table 200. A query that requires values from column C2 must obtain those values from the persistent-format data 108. Thus, the mirrored-data-set in the given example includes column C1 and column C3.

The mirrored data may also be a combination of multiple mirrored-data-sets. The multiple mirrored-data-sets may differ in granularity. For example, the granularity of mirrored-data-sets may be table, column, row ranges, partitions, segments, extents, or other levels of granularity. For example, distinct IMU structures may be maintained for column C1 and column C3. In the given example, the mirror-format data 104 includes an in-memory-group 220 for a mirrored-data-set that includes values from column C1 of table 200. The mirror-format data 104 also includes an in-memory-group 230 for a particular mirrored-data-set that includes values from column C3 of table 200. Each in-memory-group 220 and 230 includes a set of one or more IMUs 222-224 and 232-234 of the corresponding mirrored-data-set. IMU versions for mirrored-data-sets shall be described in greater detail hereafter.

The mirror-format data 104, or portions thereof, may be compressed. However, according to some embodiments, not all mirrored data need be compressed in the same way, or to the same degree. For example, if it is determined that the data from column C1 of table 200 is used frequently, and the data from column C3 is used infrequently, then the copies of the mirrored data items in the corresponding IMUs 222-224 for column C1 may be lightly compressed, whereas the copies of the mirrored data items data in the corresponding IMUs 232-234 for column C3 may be highly compressed.

In some embodiments, a compression scheme is applied on a per-IMU basis. The compression algorithm and/or the degree of compression used by the algorithm applied to each portion may be specified by a user, or may be determined automatically by a database server based on various factors. Possible compression algorithms include, but are not limited to, dictionary-based compression, run-length encoding (RLE), Ozip compression, etc. Ozip compress is described in U.S. Provisional Patent No. 61/955,574, filed Mar. 19, 2014, the contents of which are incorporated herein by this reference. The factors used by the database server to determine how each portion of mirror-format data 104 is compressed may include, for example, the frequency with which each portion is accessed, and how much data is in the portion, and how much volatile memory is available. In general, the more frequently a portion of the mirror-format data is accessed, the less compressed the data. As another general rule, the less volatile memory that is available to store the mirror-format data and/or the larger the size of the portion of the mirror-format data, the higher the compression.

In-Memory Units

As explained above, the mirror-format data is maintained in volatile memory as in-memory units (IMU). One example of how IMUs may be implemented is as an in-memory compression unit (IMCU). IMCUs are described in detail in the Mirroring Application. Example embodiments are described hereafter that refer to IMUs, but may apply to any in-memory data set that corresponds to a set of mirrored data.

An IMU is associated with a snapshot time. The copies of the data items in a particular IMU reflects changes made and committed to the data items up to the associated snapshot time. One example of an IMU is the IMCU implemented in Oracle DBIM. Example embodiments are described hereafter that refer to IMUs, but may apply to any IMU that corresponds to a set of mirrored data.

As used herein, the term "snapshot time" refers to any logical timestamp data usable to uniquely determine an order between any two snapshot times. In some embodiments, the snapshot times are generated using a shared logical clock service that assigns a logical timestamp to actions, records, updates, requests, or other events. A logical timestamp may be based on an actual time, an order, or any other data usable to indicate an order. As used herein, the term "time" may refer to an actual time and/or a logical time.

In some embodiments, the in-memory-groups 220 and 230 each include a set of IMUs corresponding to a particular mirrored-data-set. In the present example, IMU 222 is a first IMU Vi of the mirrored-data-set that includes values from C1 of table 200. IMU 222 reflects changes made to the data items in the particular mirrored-data-set up to a first snapshot time. Similar to IMU 222, IMU 224 is an nth IMU $V_n$ that includes values from C1. However, unlike UMU 222, IMU 224 reflects changes made to the data items up to an nth snapshot time.

Likewise, IMU 232 is a first IMU Vi of the mirrored-data-set that includes values from C3 of table 200. IMU 232 reflects changes made to the data items up to a first snapshot time. IMU 234 is an mth IMU $V_m$ of the mirrored-data-set that includes values from C3. IMU 234 reflects changes made to the data items up to an mth snapshot time for group. In some embodiments, the various mirrored-data-sets are not necessarily repopulated at the same time. Thus, the first snapshot time for IMU 222 of in-memory-group 220 does not have to be the same snapshot time as the first snapshot time for IMU 232 of in-memory-group 230.

The number of IMUs for a mirrored-data-set may be predetermined, automatically determined, or dynamically determined. In addition, the number may differ for different mirrored-data-sets. In some embodiments, the number of IMUs is reduced when a limiting condition is encountered, such as when memory pressure is detected. The number of IMUs may be different for each in-memory-group 220 and 230. The number of IMUs maintained for a particular mirrored-data-set may be based on one or more factors, such as but not limited to available memory, frequency of updates, frequency of access, other staleness metrics, frequency of repopulation, other factors, or any combination thereof.

In some embodiments, one or more retention policies are implemented. As used herein, the term "retention policy" refers to any rule, heuristic, or other guideline for determining whether one or more IMUs should be retained. Retention of IMUs shall be described in greater detail hereafter.

According to some embodiments, even though the mirror-format data uses a different format than the persistent-format data, the mirror-format data is organized in a manner that corresponds to the organization of the persistent-format data. For example, in persistent storage 110, the persistent-format data may be stored in blocks that reside in extents which, in turn, are organized into segments. Under these circumstances, within volatile memory 102, the mirror-format data 104 may be organized based on the extents and/or segments to which the data belongs. Thus, column vector 220 may be divided into vector portions, each of which corresponds to a particular range of extents and/or segments.

Within the extents, data is typically ordered by rowid. Similarly, in some embodiments, the mirror-format data 104 is ordered based on rowid. In some embodiments, one or more IMUs 222-224 and 232-234 are stored as column vectors that each store a version of contiguous series of values. For example, the values in column vectors 222-224 are ordered based on the same rowids that are used to order the persistent-format data in blocks 202, 204 and 206. In alternative embodiments, some or all of the data items in the mirror-format data 104 are not ordered, within the mirror-format data 104, by rowid.

Staleness Metadata

As used herein, the term "staleness metadata" refers to data that indicates which particular values in an IMU of a mirrored-data-set are no longer up to date. For example, when the persistent copy of a particular mirrored data item is updated, then the corresponding in-memory copy in the current IMU becomes stale. An update may include an operation that changes, inserts, deletes, or otherwise modifies one or more data items. In some embodiments, staleness metadata is maintained in-memory for each IMU of a mirrored-data-set, but staleness metadata is only updated for a current IMU. That is, the changes that occurred during each specific time period are recorded in staleness metadata for a particular IMU of the mirrored-data-set.

The generation of $IMU_1$ may involve reading one or more data items from another source. For example, the data items may be obtained from a persistent-format copy in persistent storage, a persistent-format copy residing in a cache, a mirror-format copy from a non-current IMU, or any combination thereof. When no current IMU exists, an IMU is generated without using an IMU. When a current IMU does exist, non-stale portions of the current IMU may be used to generate, or repopulate, the next IMU. In some embodiments, an IMU is not made available to respond to queries until the generation of the IMU is complete at a completion time (e.g. $t_{C1}$ for $IMU_1$).

As used herein, the term "staleness metadata unit" (SMU) refers to a set of staleness metadata that indicates whether copies of data items in a particular IMU are stale. In some embodiments, an SMU is a bit vector, where the ordered bits in the SMU correspond to the ordered values in an IMU comprising a column vector. A value in the bit vector is set to "1" to indicate that a row or entry corresponding to the bit has been updated in the IMU corresponding to the SMU at some point after the snapshot time of the IMU. For example, referring to FIG. 3, $SMU_1$ is a bit vector that indicates that one value in $IMU_1$ is stale. More specifically, the third bit of $SMU_1$ is set to 1, indicating that the third value in $IMU_1$ ($R3C1_1$) is stale. That is, the value of $R3C1_1$ may no longer reflect the value of R3C1 in table 200. Each copy of each data item in an IMU is guaranteed to be transactionally consistent as of a particular snapshot time. After the particular snapshot time, a copy of a particular data item in the IMU is guaranteed to be transactionally consistent only if the corresponding staleness metadata does not indicate that the particular data item was updated.

The manner in which staleness metadata is stored may vary from implementation to implementation. For example, the database server may maintain, in volatile memory, a list of those invalid data items and/or data blocks. As another example, the database server may maintain, in volatile memory, a bitmap, in which each bit corresponds to a data item, and the value of the bit indicates whether the corresponding data item has been invalidated. As yet another example, an SMU may be integrated with the IMU such that each data item copy in the IMU has a "validity bit" whose value indicates whether the data item is valid. There are merely examples of the numerous ways to keep track of which data items within an IMU have been invalidated. For clarity, some embodiments described herein are described in terms of IMUs and SMUs. However, other staleness metadata and other IMU structures may be implemented in accordance with these examples.

In some embodiments, the staleness metadata may include additional information. For example, in some embodiments, the staleness metadata may indicate a time at which a particular data item was modified, thereby allowing the value stored in a particular IMU to be used if the target snapshot time of the query falls into the corresponding time period but the modification time occurred after the query snapshot time. In some embodiments, the staleness metadata may additionally indicate whether an updated data item value may be obtained from another source, such as but not limited to one or more persistent data blocks, a buffer cache, a transaction journal, and/or another transaction record. For example, the staleness metadata may indicate whether the current version of a particular data item exists in an in-memory log of updates to the relevant data items. An in-memory log of the updates may be useful to provide faster access to the updated data without incurring the overhead of updating the current IMU, which may include decompressing the IMU and then recompressing the IMU after updating the updated value.

For example, in many database systems, transactions (or individual statements within a transaction) are assigned a snapshot time, and return data that reflects the state of the database as of that snapshot time. Specifically, if a transaction is assigned a snapshot time of T3, then the transaction must be provided versions of data items that include all changes that were committed before T3, and no changes that were not committed as of T3 (except for changes that the transaction makes itself). For such transactions, a set bit in a particular SMU does not necessarily indicate that a particular IMU cannot be used to be the source for corresponding data item. More specifically, even though the corresponding bit for that row is set in the corresponding SMU, such transactions may still use the IMU to obtain the data item if the corresponding bit was first set after the snapshot time of the transaction.

Maintaining IMUs and SMUs

Figure 3:
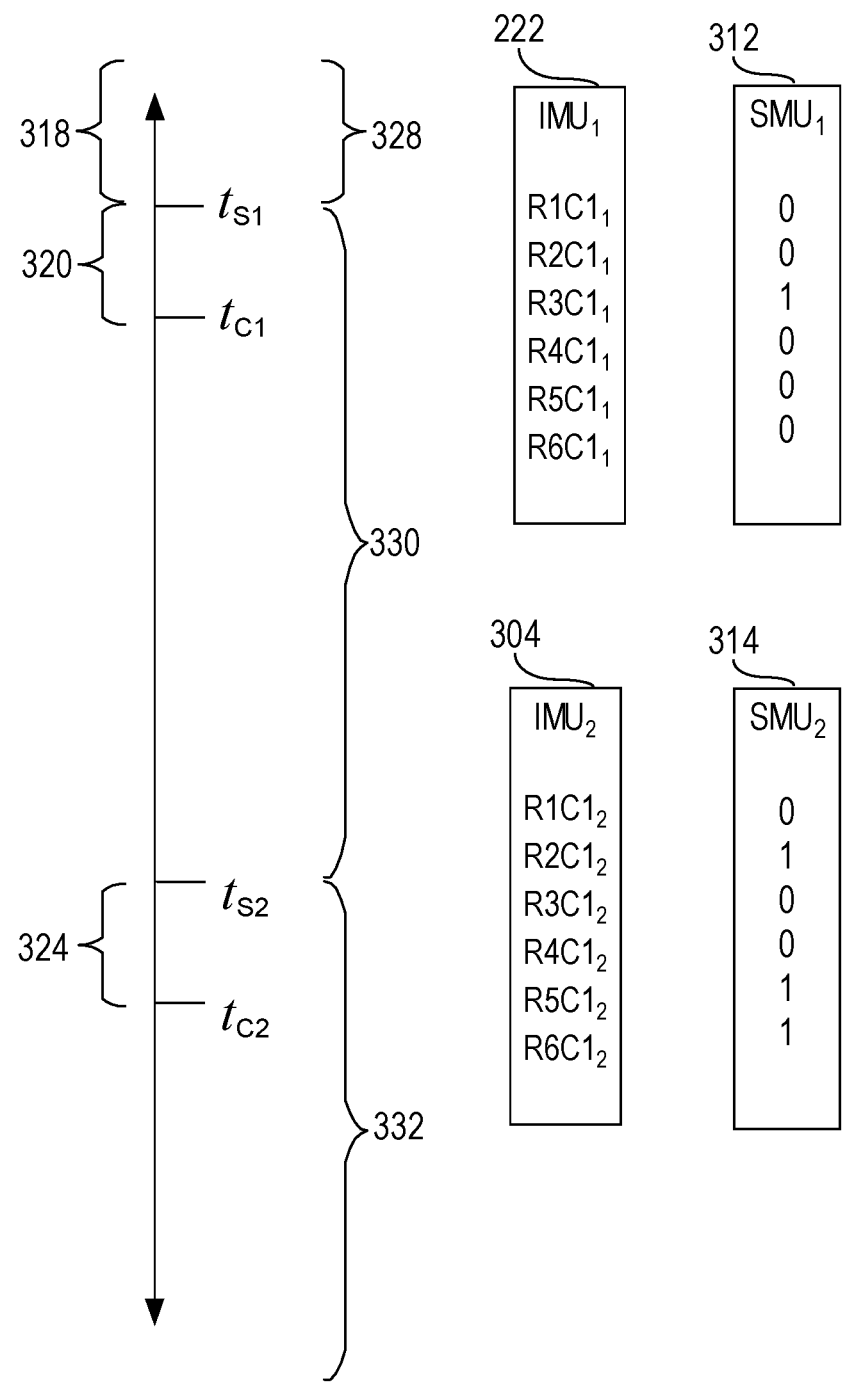
FIG. 3 is a block diagram of a group of in-memory data sets for a mirrored data set and the corresponding staleness metadata, according to an embodiment.

FIG. 3 is a block diagram of an in-memory-group of IMUs for a mirrored-data-set and the corresponding staleness metadata, according to an embodiment. $IMU_1$ 222 is a first IMU containing the values of column C1 in table 200. $IMU_1$ includes a copy of each data item in the corresponding mirrored-data-set, and reflects all changes made to those data items as of a first snapshot time $t_{S1}$. In one embodiment, the generation of $IMU_1$ begins at the first snapshot time $t_{S1}$ and is complete at a first snapshot completion time $t_{C1}$. The use of snapshot completion times shall be described in greater detail hereafter.

During a first period that begins at $t_{S1}$, the database server responds to updates to the data items in a mirrored-data-set by changing copies of the data items in the persistent data set without updating copies of the data items in the current IMU of the mirrored-data-set. The occurrence of the update is recorded by storing staleness metadata 242 that indicates that the copy of data item is stale in the corresponding in-memory-data set.

For example, in the illustrated example, in-memory-group 220 corresponds to the mirrored-data-set R1C1-R6C1. $IMU_1$ 222 is current during a first time period 330. In the illustrated embodiment of FIG. 3, the first time period 330 begins at the first snapshot time $t_{S1}$ and ends at the second snapshot time $t_{S2}$. During the first time period 330, the database server responds to updates to the corresponding mirrored-data-set R1C1-R6C1 by changing the persistent copies of the affected data items, and recording the changes in $SMU_1$ 312 without updating the in-memory copies in $IMU_1$. In the illustrated example, an update to R3C1 of table 200 occurs during the first time period 330. $IMU_1$ is not modified even though the value R3C1 has changed in block 204 in persistent storage 110. Thus, due to the update, the value $R3C1_1$ in $IMU_1$ becomes stale. The database server sets the third bit in $SMU_1$ to "1" to indicate that the value $R3C1_1$ in $IMU_1$ is stale.

The illustrated example shows an in-memory-group of IMUs and SMUs at a point in time when $IMU_2$ is the current IMU. $SMU_1$ indicates that R3C1 was updated during the first period, so the corresponding copy $R3C1_1$ in $IMU_1$ may not reflect the update to R3C1. Furthermore, $SMU_1$ indicates that the other values R1C1, R2C1, R4C1, R5C1 and R6C1 were not updated during the first period, so the corresponding copies $R1C1_1$, $R2C1_1$, $R4C1_1$, $R5C1_1$ and $R6C1_1$ in $IMU_1$ should reflect the values of the data items as of any time in the first period from $t_{S1}$ to $t_{S2}$.

During subsequent periods, the database server responds to updates to the data items in a mirrored-data-set by changing copies of the data items in the persistent data set without updating copies of the data items in the current IMU for the mirrored-data-set.

$IMU_2$ 304 is a second IMU containing the values of column C1 in table 200. $IMU_2$ includes a copy of each data item in the corresponding mirrored-data-set, as stored persistently in the database at a second snapshot time $t_{S2}$. In the illustrated embodiment, the generation of $IMU_2$ begins at the second snapshot time $t_{S2}$ and is complete at a second completion time $t_{C2}$. In some embodiments, the generation of $IMU_2$ involves obtaining stale data items from persistent storage (or another source) and obtaining non-stale items from $IMU_1$, where staleness is indicated by $SMU_1$. When the IMUs in the in-memory-group of IMUs for the mirrored-data-set are compressed, the generation of $IMU_2$ may involve decompressing $IMU_1$, obtaining current versions of stale data items from persistent storage, obtaining non-stale items from $IMU_1$, and compressing $IMU_2$.

$IMU_2$ is current during a second time period 332. In the present example, the second time period 332 begins at the second snapshot time $t_{S2}$ and ends at a later snapshot time that corresponds to the next IMU generated. In the illustrated example, the generation of the next IMU has not been initiated, and $IMU_2$ is the current IMU. During the second time period 332, the database server responds to updates to the corresponding mirrored-data-set by changing persistent-format copies of the affected data items, and recording the changes in $SMU_2$ without updating the in-memory copies in $IMU_2$. In the illustrated example, during time period 332, update/s to R2C1, R5C1, and R6C1 of table 200 occur. Thus, due to the update/s, the values $R2C1_2$, $R5C1_2$, and $R6C1_2$ in $IMU_2$ become stale. The second, fifth, and sixth bits in $SMU_2$ are set to "1" to indicate that the corresponding values in $IMU_2$ are stale.

In some embodiments, one or more SMUs 312-314 may include a hierarchical structure that includes not only the row-level bit vector, but additional levels of staleness information that correspond to a different level of data, such as database, tables, extents, and/or blocks. For example, extent-level staleness information may indicate any extent that includes a data item that was updated, and block-level staleness information may indicate any block that includes a data item that was updated.

In some embodiments, staleness metadata 242 is created on an as-needed basis. For example, the creation of $SMU_1$ may not be triggered until the actual update to data item R3C1 is performed, causing the value $R3C1_1$ in $IMU_1$ 222 to become stale. Thus, if all data items in an IMU are current, some embodiments to not create the corresponding SMU data structure. By only storing changed-row information for data items or other hierarchical levels that have been changed or added since the snapshot time of the IMU, the size of the staleness metadata 242 may be significantly smaller than it would otherwise be if bits were pre-allocated for every row for all IMUs of all mirrored-data-sets.

Selecting an IMU for a Request

For one or more mirrored-data-sets, multiple IMUs are maintained. The database server determines the appropriate data source to access to respond to the request based on a target snapshot time associated with a request. As used herein, the term "target snapshot time" refers to a time associated with a query or other request. The database server is expected to return results that are consistent with the target snapshot time.

For example, if the target snapshot time of the request falls in a period corresponding to a specific version of an IMU, then the specific IMU and its SMU may be used to respond to the request for data item/s. More specifically, for data item/s that the SMU indicates are not stale in the specific IMU, the database server may use the specific IMU to respond to the request. On the other hand, for data item/s that the SMU indicates are stale in the specific IMU, the database server may access an up-to-date version of the data item/s from another source. Thus, the in-memory-group of IMUs allow the database server to use an IMU to accurately respond to a query.

The staleness metadata can be used to determine which data items in a version of an IMU are stale. When a current IMU is used to respond to a query with a target snapshot time in the current period, the current SMU indicates which data items are stale in the current IMU. When a prior IMU is used, the associated SMU indicates which data items became stale in the associated time period that the prior IMU was current. The prior IMU may be used to respond to a query, even if the query has a target snapshot time after the time period associated with the prior IMU, by referring to subsequent SMUs. The subsequent SMUs indicate which data items became stale in subsequent time periods.

In particular, multiple SMUs may be used during repopulation. During repopulation, the new version of the IMU will not be available until repopulation is complete, but the previous version of the IMU is still maintained in memory. When the generation of the new version is not yet complete, the database server may respond to the request based on the previous version of the IMU, the staleness metadata corresponding to the previous version, and the staleness metadata corresponding to the new version. For example, if either staleness metadata for the previous version or the new version indicate that the copy of the data item in the previous version of the IMU is stale at the target time, the database server may access an up-to-date version of the particular data item from another source, such as from the persistent copy. This allows the regression of scan latency due to unavailability of in-memory data during repopulation to be avoided.

For requests with a target snapshot time that falls in time period 328, no IMU is available. The database server will handle such requests by accessing the required data items from another source, such as from persistent storage 110 or cache 106.

For queries or other requests with a target snapshot time that falls in time period 330, but not within time period 320, $IMU_1$ can be used. $IMU_1$ reflects the values of the persistent copies of the mirrored-data-set at the first snapshot time $t_{S1}$, and $SMU_1$ contains staleness metadata that identifies data item copies in $IMU_1$ that have become stale. Thus, non-stale values of $IMU_1$, as indicated by $SMU_1$, can be used to respond to a request or query with a target snapshot time falling in time period 330.

However, if such a request is processed during time period 320, $IMU_1$ will not be available. Although $IMU_1$ is the current IMU during time period 320, IMU repopulation is not complete until $t_{C1}$. Thus, atomicity, consistency, isolation, durability (ACID properties of a database) cannot be guaranteed when $IMU_1$ is used. Furthermore, when the final format of $IMU_1$ is a compressed format, the individual values of $IMU_1$ may not always be accessible until $IMU_1$ is complete.

For queries or other requests with a target snapshot time that falls in time period 332, $IMU_2$ can be used as long as $IMU_2$ is available. $IMU_2$ reflects the values of the persistent copies of the mirrored-data-set at the second snapshot time $t_{S2}$, and $SMU_2$ contains staleness metadata that identifies data item copies in $IMU_2$ that have become stale. Thus, non-stale values of $IMU_2$, as indicated by $SMU_2$, can be used to respond to a request or query with a target snapshot time falling in time period 332. For data items that are stale, the database server will handle such requests by accessing the required data items from another source, such as from persistent storage 110 or cache 106.

In some instances, $IMU_2$ may be unavailable to process a request with a target snapshot time that falls in time period 332. For example, if such a request is processed during time period 324, $IMU_2$ may not be available because generation of $IMU_2$ is not yet complete during time period 324. Although $IMU_2$ is the current IMU during time period 324, IMU repopulation is not complete until the second completion time $t_{C2}$. Thus, the ACID properties of a database cannot be guaranteed when $IMU_2$ is used.

However, when $IMU_1$ is still maintained in memory, $IMU_1$ may be used to respond to the request. $SMU_1$ contains staleness metadata that identifies data item copies in $IMU_1$ that have become stale up to the second snapshot time $t_{S2}$, while $SMU_2$ contains staleness metadata that identifies data item copies that have become stale since the second snapshot time $t_{S2}$. Thus, the combination of $SMU_1$ and $SMU_2$ may be used to determine which data item copies in $IMU_1$ are potentially stale at the target snapshot time falling in time period 332.

Generating the Initial IMU

According to some embodiments, for a particular mirrored-data-set, an initial IMU (the first IMU of the mirrored-data-set) is generated based on the persistent-format data 108 in persistent storage 110. For example, $IMU_1$ is a first IMU for the in-memory-group 220 corresponding to the mirrored-data-set of values in rows R1-R6 of column C1 of table 200. In the given example, the mirror-format is columnar. However, other forms of mirror-format data, including other forms of mirror-format data in another format that is different from the persistent-format, may be used.

Regardless of the particular mirror-format used, the mirror-format data 104 is created in memory based on existing persistent-format data 108 without causing a change to the persistent-format data 108. Unlike cache 106, mirror-format data is not simply a copy of the data that is stored in persistent storage 110. Rather, because the mirror-format is not based on the persistent-format, volatile memory 102 is initially populated by reading the persistent-format data from persistent storage 110 and converting the obtained persistent-format data to mirror-format data. For example, $IMU_1$ may be created by reading the values in rows R1-R6 of column C1 of table 200 from blocks 202-206 in persistent storage 110.

The amount of overhead that is required to perform the persistent-format to mirror-format conversion will vary from situation to situation, based on how different the mirror-format is from the persistent-format. For example, if the persistent-format is row-major disk blocks that have been compressed one way, and the mirror-format is column vectors that are compressed another way, the amount of overhead required to perform the conversion may be extensive.

When a format is applied on a particular level of granularity, such as the block level, the particular format is used to format data for an entire block to which the format is applied. In some embodiments, for the persistent-format data, a persistent-format, such as a row-major format, may be applied on a block level to one or more blocks 202-206 of persistent-format data 108. In some cases, the persistent-format allows for access to individual values. However, if the persistent-format does not allow access individual values stored in blocks 202-206, then blocks 202-206 must be converted to retrieve values R1C1-R6C1.

In some embodiments, a mirror-format may be applied on a data-set level to one or more IMUs of mirror-format data 104. IMUs 222-224 of in-memory-group 220 are in the mirror-format. In some embodiments, the mirror-format may be a vector-level compression format applied to the entire column vector R1C1-R6C1 stored in each IMU 222-224. In this case, after obtaining the values R1C1-R6C1 from the persistent-format data 108, the initial $IMU_1$ of in-memory-group 220 is generated in the mirror-format by applying the required vector-level compression to generate $IMU_1$ in the mirror-format.

In some embodiments, each individual value R1C1-R6C1 in the mirrored-data-set may be stored in a different format in persistent-format data and in mirror-format data. For example, aside from any block-level compression scheme applied to blocks 202-206 or column-level compression scheme applied to IMUs 222-224, the individual values R1C1-R6C1 may be stored in an first-individual-value-format in blocks 202-206, while the individual values R1C1-R6C1 may be stored in a second-individual-value-format format in IMUs 222-224. For example, the first-individual-value-format and/or the second-individual-value-format may be different compression formats, encodings, and/or uncompressed data. When the first-individual-value-format and the second-individual-value-format are different, the values obtained from blocks 202-206 must be converted from the first-individual-value-format format to the second-individual-value-format before generating $IMU_1$. The conversion is performed after any required decompression on blocks 202-206 and after any required vector-level compression is applied to generate $IMU_1$ 222.

Repopulation

As used herein, the term "repopulate" refers to generating a new IMU for a mirrored-data-set using a current IMU for the mirrored-data-set and the corresponding staleness metadata. The new IMU of the mirrored-data-set becomes the current IMU of the mirrored-data-set.

Repopulation takes advantage of the fact that some of the data items needed to generate the new version of the IMU may already reside in volatile memory 102 in the current version of the IMU. More specifically, the staleness metadata corresponding to the current version of the IMU may be used to determine which data items are stale in the current version of the IMU.

In some embodiments, staleness metadata is maintained separately for each version of the IMU. Thus, when an IMU is repopulated at a given time, new staleness metadata is separately stored in association with the new version. Thus, the prior staleness metadata stored in association with the prior version will indicate which data items in the prior version are stale as of this given time and no later.

The new version reflects the state of the mirrored-data-set in the persistent-format data 108 at a subsequent time. For data items that are not stale in the prior version, a copy may be retrieved from the prior version of the IMU, eliminating the need to access persistent storage 110. For data items that are stale in the prior version, a copy is retrieved from another source, since the copy in the prior version of the IMU is stale. For example, a copy may be retrieved from persistent storage 110, cache 106, or another source.

As used herein, "repopulating an IMU" refers to generating a new IMU based on a current IMU and its corresponding SMU. The new IMU is an IMU that reflects the state of the mirrored-data-set, as stored persistently in the database at a more recent point in time. Over time, the number of invalid data items within an IMU will increase. The higher the number of invalid data items within an IMU, the less efficient use of the IMU becomes. For example, if 90% of an IMU is invalid, then the database server incurs the overhead of checking the IMU, while still having to incur the overhead of obtaining the desired data items from another source 90% of the time.

In some embodiments, when a threshold amount of data in an IMU becomes stale, repopulation is triggered. The threshold may be one among a number of other factors that trigger repopulation, such but not limited to frequency of access, user preferences, available memory, or any combination thereof. Furthermore, repopulation may occur independently for different mirrored-data-sets. In some embodiments, a particular column or other mirrored set of data is divided into multiple mirrored-data-sets, each corresponding to its own IMU in-memory-group, for which IMU repopulation occurs independently. When only a subset of data blocks incur DML activity in normal OLTP workloads, it is common that only a small percentage of IMU in-memory-groups become repopulation candidates.

In the illustrated embodiment, IMU repopulation is performed to generate the new IMU ($IMU_2$) beginning at the second snapshot time $t_{S2}$. Staleness metadata corresponding to updates to the underlying data in column C1 of table 200 that occur from time $t_{S1}$ to $t_{S2}$ were recorded in $SMU_1$. For updates to the underlying data occurring after time $t_{S2}$, staleness metadata is recorded in $SMU_2$ rather than $SMU_1$.

$IMU_2$ may be generated based on one or more components from $IMU_1$ that are not stale. In some embodiments, $IMU_1$ is decompressed, if necessary, and the stale data items in $IMU_1$ are replaced with non-stale copies of the stale data items from another source, such as but not limited to one or more persistent data blocks, a buffer cache, a transaction journal, etc. The stale data items may be identified based on $SMU_1$. In the illustrated example, $SMU_1$ is a bit vector that corresponds to the column vector in $IMU_1$, and the bit set to "1" in $SMU_1$ indicate that the corresponding data item $R3C1_1$ in $IMU_1$ is stale. To generate $IMU_2$, the copies of the non-stale data items in memory in $IMU_1$ ($R1C1_1$, $R2C1_1$, $R4C1_1$, $R5C1_1$, and $R6C1_1$) may be used. A non-stale copy of the data item R3C1 is obtained from another source, such as block 204 in persistent storage 110, cached block 204 in cache 106, a transaction journal, and/or another transaction record. The resulting set of values in $IMU_2$ includes copies of the data items ($R1C1_2$, $R2C1_2$, $R3C1_2$, $R4C1_2$, $R5C1_2$, and $R6C1_2$) that reflect changes made to the data items in the mirrored-data-set up to the second snapshot time $t_{S2}$. If necessary, the set of values are compressed to generate $IMU_2$.

In some embodiments, repopulation begins with memory allocation of a new staleness metadata, such as $SMU_2$. After the new staleness metadata is allocated, a set of latches are taken for exclusive access on the prior IMU (e.g. $IMU_1$) and the new staleness metadata (e.g. $SMU_2$) until repopulation is complete.

Selecting Data Set/s to Mirror

The decision of which persistent-format data to mirror, and when to load it, may be based on a variety of factors. For example, if a system has a large amount of volatile memory 102, and a relatively small database, it may be desirable to mirror the entire database. Thus, all persistent-format data would also be mirrored in the mirror-format data. On the other hand, if there is a relatively small amount of volatile memory 102 relative to the size of the database, then it may be optimal to only mirror a very small fraction of the database. Typically, when not all of the database is to be mirrored, the portion that is selected to be mirrored is based on which portion will most improve overall performance of the system. Typically, mirroring data that is used frequently will provide more benefit than mirroring data that is used less frequently. Thus, if one table, one column of a table, or one partition of a table is access more frequently than other data in the database, that table, column or partition may be selected to be mirrored in volatile memory 102. The selection of which portions of a database to mirror may be made at any level of granularity. For example, the selection may be made on a per-table basis, a per-column basis, a per extent basis, a per segment basis, a per-table-partition basis, etc.

The decision about when to create the mirror-format data may be based on a variety of factors. For example, if sufficient time is available at system start-up, all of the persistent-format data that has been selected for mirroring may be pre-loaded into volatile memory 102 on start up. As mentioned above, loading the mirror-format data involves reading the corresponding persistent-format data from persistent storage 110 and then converting that persistent-format data into the mirror-format.

In some embodiments, the mirror-format data is pre-loaded into volatile memory at database system start up. The pre-loading may be performed, for example, by background processes before any database operation is executed against the data structures that contain the mirrored data items. The mirror-format data may be created one-IMU at a time.

Example Processes for Generating and Maintaining IMUs

Figure 4:
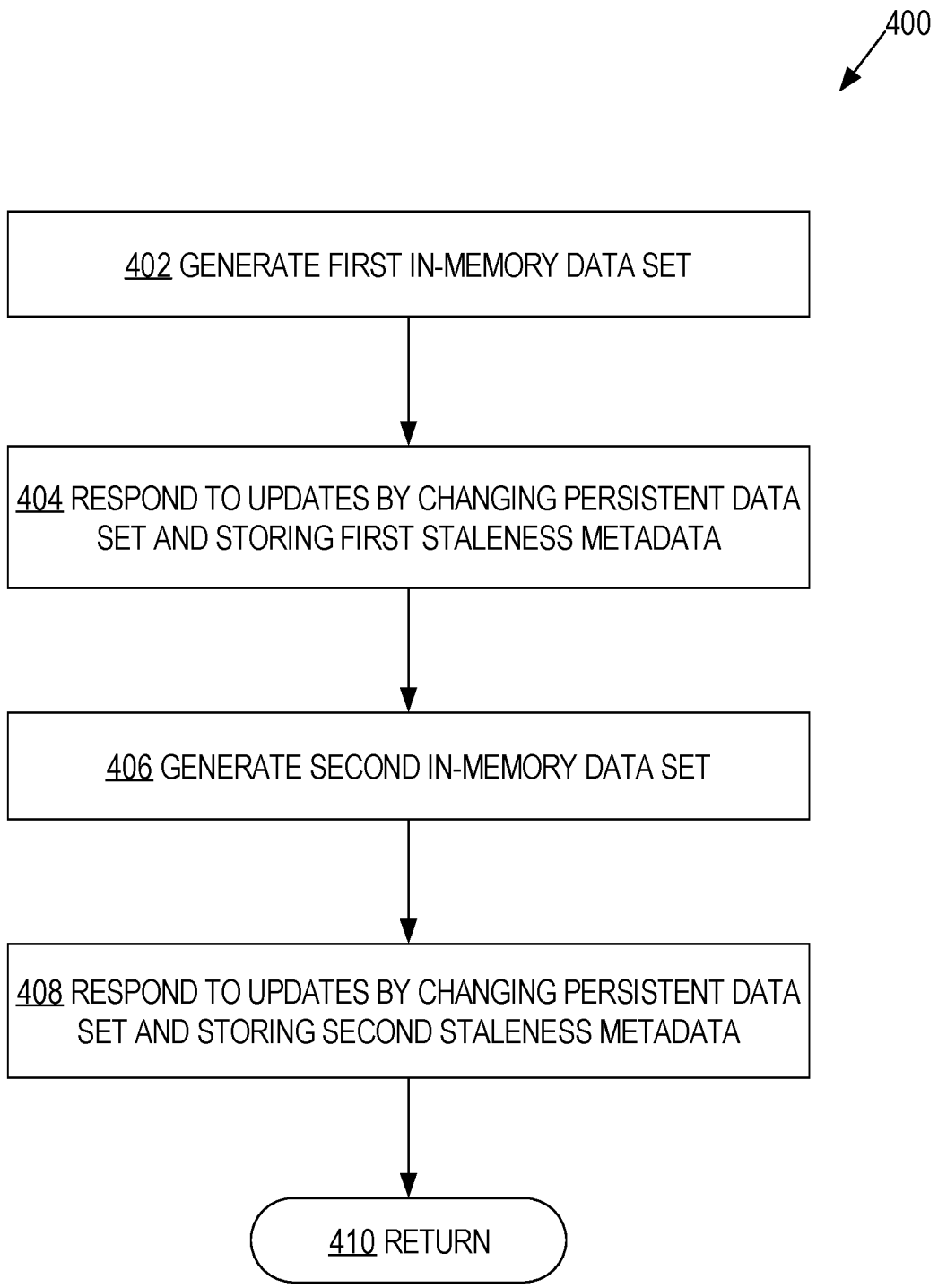
FIG. 4 is a flow diagram illustrating a process for generating and maintaining a group of in-memory versions of a mirrored data set, according to an embodiment.

FIG. 4 is a block diagram illustrating a process for generating and maintaining IMUs for a mirrored-data-set, according to an embodiment. Process 400 may be performed by one or more computing devices and/or processes thereof. For example, one or more blocks of process 400 may be performed by computing device 900. In some embodiments, one or more blocks of process 400 are performed by a database server, such as database server 120.

At block 402, the database server generates a first IMU. The first IMU comprises a copy of each data item in a mirrored-data-set, each copy reflecting changes made to the data item up to a first snapshot time. When there is no IMU of the mirrored-data-set in volatile memory before the first IMU is generated, the first IMU is generated based on persistent copies of the items in the mirrored-data-set that are obtained from persistent storage, a cache of persistent storage data, or another source. The database server maintains the first IMU in volatile memory.

At block 404, the database server responds to updates to a first set of updated data items by changing the persistent data set and storing first staleness metadata. The database server changes persistent copies of the first set of updated data items without updating the corresponding copies in the first IMU. For example, the database server may execute one or more transactions that update the persistent copy of the first data items in a database. The database server stores first staleness metadata that indicates that the copies of the first data items in the first IMU are stale. In some embodiments, the first staleness metadata is stored as a first bit vector.

At block 406, the database server generates a second IMU. An example process 500 for generating a second IMU is discussed in greater detail hereafter. In some embodiments, the second IMU is generated when the database server determines that the IMU should be repopulated. The second IMU comprises a copy of each data item in the mirrored-data-set, each copy reflecting changes made to the data item up to a second snapshot time. In some embodiments, the second IMU is generated based on the first IMU and the first staleness metadata. More specifically, the first staleness metadata is used to determine which data items in the first IMU are stale; copies of non-stale data items are obtained from the first IMU, while copies of stale data items are obtained from another source. The database server maintains the second IMU in volatile memory.

At block 408, the database server responds to updates by changing persistent data set and storing second staleness metadata. The database server changes persistent copies of the second set of updated data items without updating the corresponding copies in the second IMU. For example, the database server may execute one or more transactions that modify the persistent copy of the second data items in a database. The database server stores second staleness metadata that indicates that the copies of the second data items in the second IMU are stale. In some embodiments, the second staleness metadata is stored as a second bit vector.

The second set of updated data items and the first set of updated data items can be identical or different; each particular data item in the mirrored-data-set may belong to either the first set of updated items data items (the particular data item was updated in the first period), the second set of updated data items (the particular data item was modified in the second period), both (the particular data item was modified in the first time period and again in the second period), or neither (the particular data item was not modified during either period).

At block 410, process 400 returns and/or terminates. For example, processing may continue to processing a successive data item, passing control to a calling process, generating any appropriate record or notification, returning after a method or function invocation, or terminating.

Figure 5:
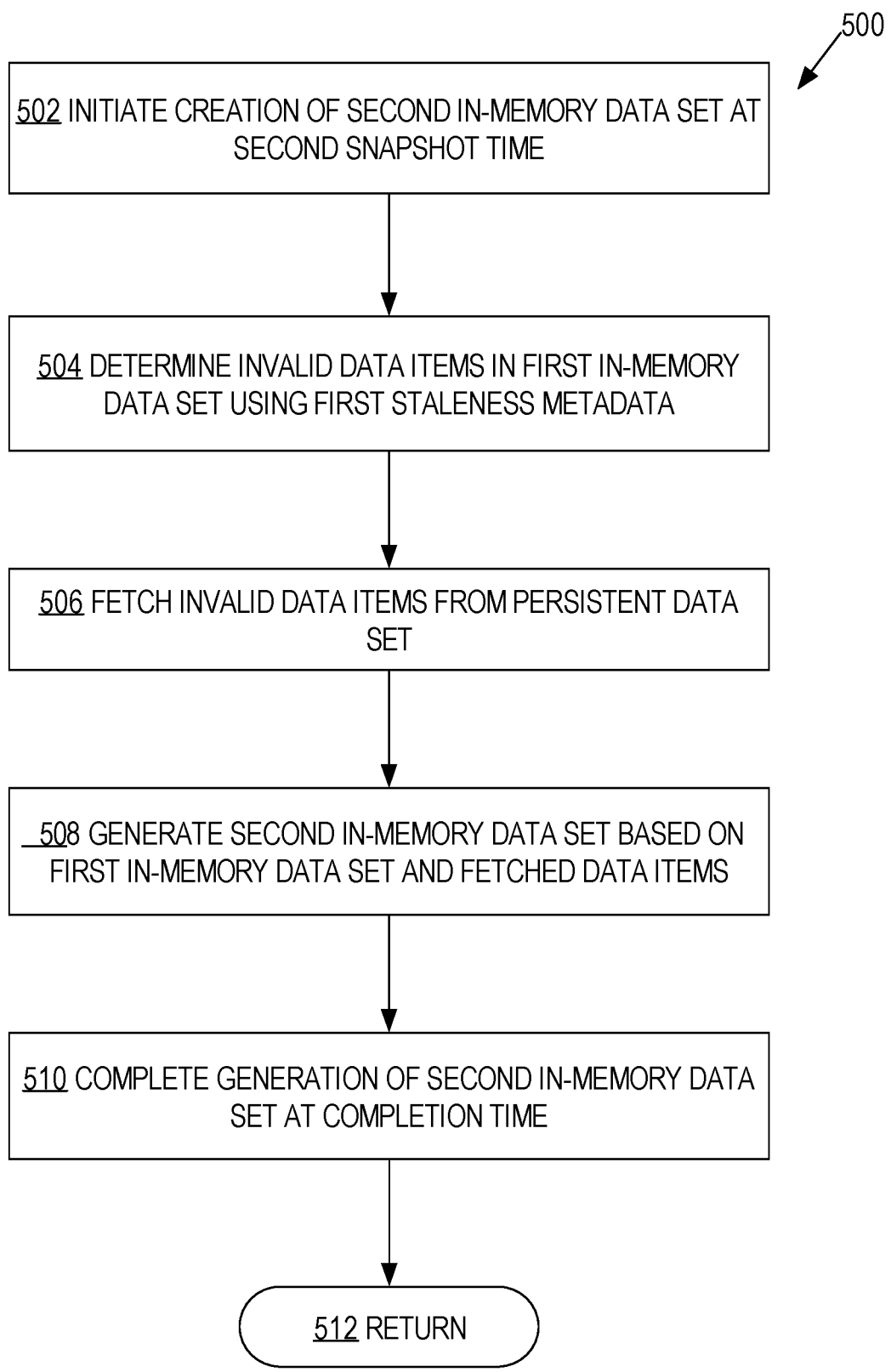
FIG. 5 is a flow diagram illustrating a process for generating a new in-memory version for a mirrored data set, according to an embodiment.

FIG. 5 is a block diagram illustrating a process for repopulating an IMU by generating a new IMU for a mirrored-data-set, according to an embodiment. Process 500 may be performed by one or more computing devices and/or processes thereof. For example, one or more blocks of process 500 may be performed by computing device 900. In some embodiments, one or more blocks of process 500 are performed by a database server, such as database server 120. At the beginning of process 500, a first IMU is the current version of the IMU.

At block 502, the database server initiates creation of a second IMU at a second snapshot time. For example, the database server may initiate creation of the second IMU based on one or more factors, such as a threshold amount of stale data and/or other factors including but not limited to frequency of access, user preferences, available memory, or any combination thereof. The new version of the IMU will include copy of each data item in the mirrored-data-set, each copy reflecting changes made to the data item up to the second snapshot time. In some embodiments, upon determining to initiate creation of the second IMU, the database server stops updating the first staleness metadata, and begins to store second staleness metadata in response to updates to the underlying data, even though creation of the second IMU is not complete.

At block 504, the database server determines invalid data items in the first IMU using the first staleness metadata. The first staleness metadata associated with the first IMU includes a record of updates to the mirrored-data-set during a first period that begins at the first snapshot time and ends at the second snapshot time. Thus, the first staleness metadata may be used to identify which data item copies in the first IMU are stale or valid at the second snapshot time.

At block 506, the database server fetches invalid data items (where the copy of the data item is stale in the first IMU) from a source other than the first IMU, such as the persistent data set on persistent storage, a copy of one or more persistent data blocks in a cache, or another source.

At block 508, the database server generates the second IMU based on the first IMU and the fetched data items. The non-stale data items in the first IMU may be read from the first IMU. In some embodiments, the second IMU is generated by decompressing the first IMU (if necessary), replacing the stale data items in the first IMU with the fetched data items from the other sources, and then, if necessary, compressing or otherwise formatting or modifying the resulting data to generate the second IMU.

At block 510, the generation of the second IMU is completed at a completion snapshot time. At the completion snapshot time of the second IMU, the second IMU may be made available for use, such as to respond to queries and other database requests.

At block 512, process 500 returns and/or terminates. For example, processing may continue to processing a successive data item, passing control to a calling process, generating any appropriate record or notification, returning after a method or function invocation, or terminating.

Example Processes for Handling Requests

Figure 6:
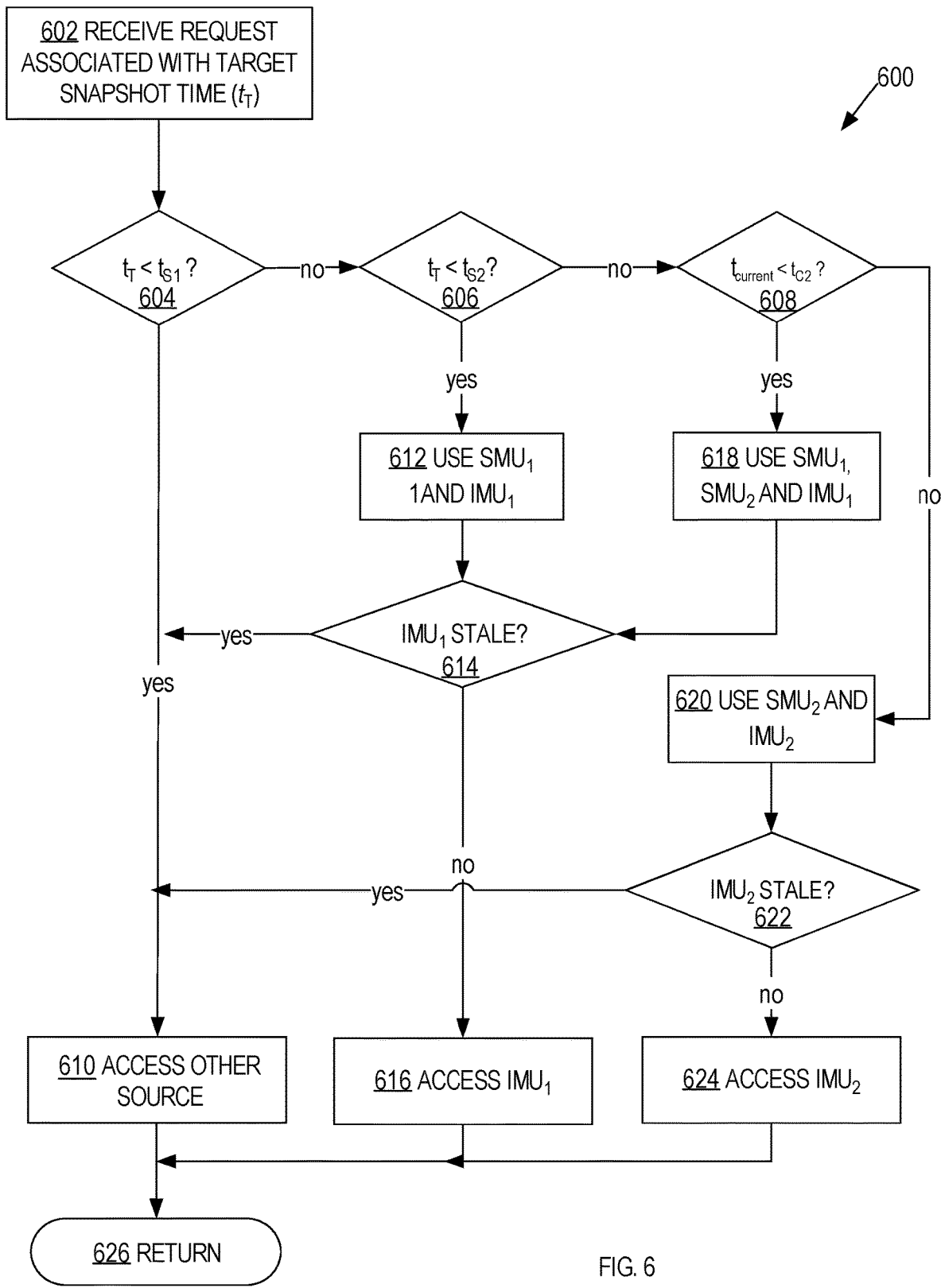
FIG. 6 is a flow diagram illustrating a process for responding to a request associated with a target snapshot time by accessing a first in-memory data set, a second in-memory data set, or a persistent data set, according to an embodiment.

FIG. 6 is a flow diagram that depict a process for responding to a request associated with a target snapshot time by accessing a first IMU, a second IMU, or a persistent data set, according to an embodiment. Process 600 may be performed by one or more computing devices and/or processes thereof. For example, one or more blocks of process 600 may be performed by computing device 900. In some embodiments, one or more blocks of process 600 are performed by a database server, such as database server 120. In the illustrated example, the current version of the IMU is $IMU_2$.

At block 602, the database server receives a request that is associated with a target snapshot time $t_T$. The request requires access to one or more particular data items in a mirrored-data-set. The database server maintains an in-memory-group of IMUs in memory for the mirrored-data-set. The request is received while the database server is maintaining both the first IMU and the second IMU. Process 600 will be discussed hereafter with respect to one particular data item that the request requires access to; portions of process 600 may be repeated to process additional data items that the request requires access to.

At decision block 604, the database server determines whether the target snapshot time $t_T$ of the request is less than a first snapshot time $t_{S1}$ associated with a first IMU, $IMU_1$. $IMU_1$ includes a copy of each data item in the mirrored-data-set, each copy reflecting changes made to the data item up to the first snapshot time $t_{S1}$.

If it is determined that the target snapshot time $t_T$ is less than the first snapshot time $t_{S1}$, processing continues to block 610, where the data item is obtained from another source (e.g. persistent storage). In this case, the target snapshot time $t_T$ of the request falls in a period for which no IMU and SMU is maintained, so the database server does not use any IMU to respond to the query.

Returning to decision block 604, if it is determined that the target snapshot time $t_T$ is not less than the first snapshot time $t_{S1}$, processing continues to decision block 606. At decision block 606, the database server determines whether the target snapshot time $t_T$ is less than a second snapshot time $t_{S2}$ associated with a second IMU, $IMU_2$. $IMU_2$ includes a copy of each data item in the mirrored-data-set, each copy reflecting changes made to the data item up to the second snapshot time $t_{S2}$.

If the database server determines that the target snapshot time $t_T$ is less than the second snapshot time $t_{S2}$, processing continues to block 612. At block 612, the database server determines that the particular data item should be retrieved using $SMU_1$ and $IMU_1$. That is, the database server has determined that the target snapshot time $t_T$ falls in a first period, from the first snapshot time $t_{S1}$ to the second snapshot time $t_{S2}$. During the first period, $IMU_1$ was the current IMU in the IMU in-memory-group for the mirrored-data-set that contains the particular data item.

At decision block 614, the database server determines whether the copy of the particular data item in $IMU_1$ is stale using the SMU determined in block 612, SMUT. If the database server determines that the particular data item is not stale in $IMU_1$, processing continues to block 616, where a copy of the data item is obtained by accessing $IMU_1$ in volatile memory. Returning to decision block 614, if the database server determines that the particular data item is stale in $IMU_1$, processing continues to decision block 610, where a copy of the data item is obtained from another source (e.g. persistent storage).

Returning to decision block 606, if the database server determines that the target snapshot time $t_T$ is not less than the second snapshot time $t_{S2}$, processing continues to decision block 608. At this point, the database server has determined that the target snapshot time $t_T$ does not fall in a period associated with a prior IMU, and thus falls in a time period associated with the current IMU, $IMU_2$. In the illustrated example, the current version of the IMU is $IMU_2$. However, if more than two versions of the IMU are maintained in memory, additional steps may be performed to determine if the target snapshot time $t_T$ falls into a period associated with another prior IMU maintained in memory, as shall be described in greater detail with respect to process 700.

At decision block 608, the database server determines whether the current time t current is less than a completion time $t_{C2}$ for $IMU_2$. Prior to the completion time $t_{C2}$, $IMU_2$ is still being generated, and is not available to use to respond to requests. Thus, although the target snapshot time $t_T$ indicates that the query can be answered using the current IMU, $IMU_2$, $IMU_2$ is not available for use at the current time $t_{current}$. In some embodiments, the current time $t_{current}$ is not explicitly stored, and the database determines whether the current time $t_{current}$ is before the completion time based on state information maintained by the database server. For example, a completion flag may be used to indicate whether generation of the current IMU is complete. Thus, the existence of the flag indicates whether the current IMU is completed at the current time $t_{current}$. As another example, the state of the database and/or database server may be updated when a new IMU is completely generated by setting the new IMU as the current IMU, such as by setting a current IMU reference to the new IMU. In this case, the current IMU reference points to the prior IMU (e.g. $IMU_1$) until the new IMU (e.g. $IMU_2$) is complete.

If the database server determines that the current time $t_{current}$ is less than the completion time $t_{C2}$, processing continues to block 618, where the database server determines that $SMU_1$, $SMU_2$, and $IMU_1$ are used to respond to the query. Although $IMU_1$ is not the current IMU, the combination of $IMU_1$, $SMU_1$ and $SMU_2$ may be used instead of $IMU_2$ and $SMU_2$. More specifically, even though the target snapshot time $t_T$ of the request falls in the time period associated with $IMU_2$, data items in $IMU_1$ may be used to respond to the query if they have not become stale by the target snapshot time $t_T$. The combination of $SMU_1$ and $SMU_2$ can be used to make this determination when processing continues to decision block 614. That is, when decision block 614 is reached from block 618, the database server determines whether the copy of the particular data item is stale in $IMU_1$ using both $SMU_1$ and $SMU_2$. The particular data item in $IMU_1$ is not stale only if both $SMU_1$ indicates that the particular data item was not modified during the first period and $SMU_2$ indicates that the particular data item was not modified during the second period.

Returning to decision block 608, if the database server determines that the current time $t_{current}$ is not less than the completion time $t_{C2}$, processing continues to block 620. At block 620, the database server determines that $SMU_2$ and $IMU_2$ are used to respond to the query.

At decision block 622, the database server determines whether the copy of the particular data item in $IMU_2$ is stale using the SMU determined in block 620, $SMU_2$. If the database server determines that the particular data item is stale in $IMU_2$, processing continues to decision block 610, where a copy of the data item is obtained from another source (e.g. persistent storage).

Returning to decision block 622, if the database server determines that the particular data item is not stale in $IMU_2$ processing continues to block 624, where a copy of the particular data item is obtained by accessing $IMU_2$ in volatile memory.

At block 626, process 600 returns and/or terminates. For example, processing may continue to processing a successive data item, passing control to a calling process, generating any appropriate record or notification, returning after a method or function invocation, or terminating.

Figure 7:
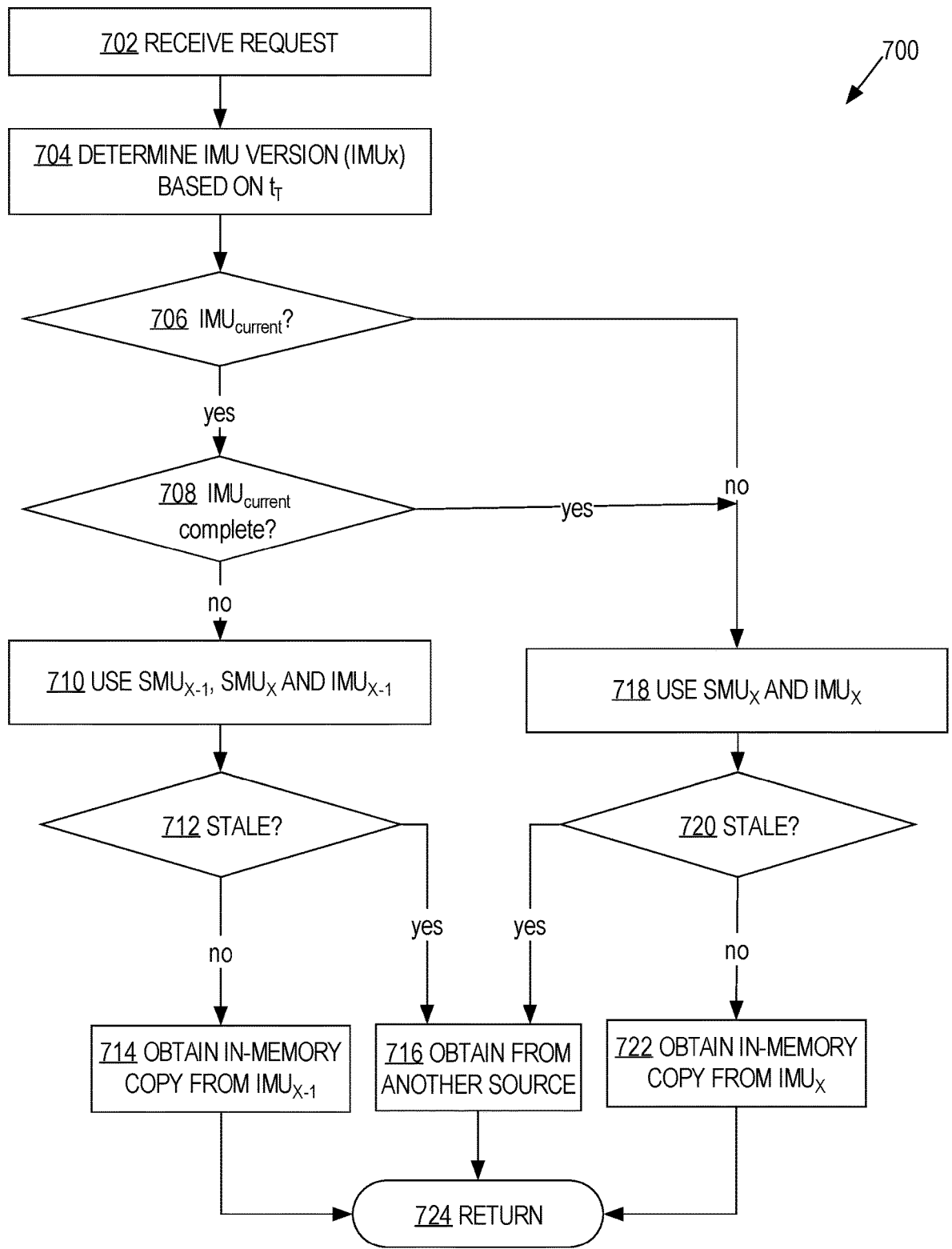
FIG. 7 is a flow diagram illustrating a process for responding to a request associated with a target snapshot time by accessing one of a set of available in-memory data sets or a persistent data set, according to an embodiment.

FIG. 7 is a flow diagram illustrating a process for responding to a request associated with a target snapshot time by accessing one of a set of available IMUs or a persistent data set, according to an embodiment. Process 700 may be performed by one or more computing devices and/or processes thereof. For example, one or more blocks of process 700 may be performed by computing device 900. In some embodiments, one or more blocks of process 700 are performed by a database server, such as database server 120. In the illustrated example, the current version of the IMU is $IMU_{current}$.

At block 702, the database server receives a request that is associated with a target snapshot time $t_T$. The request requires access to one or more particular data items in a mirrored-data-set. The request is received while the database server is maintaining an in-memory-group of IMUs in memory for the mirrored-data-set. Process 700 will be discussed hereafter with respect to one particular data item that the request requires access to; portions of process 700 may be repeated to process additional data items that the request requires access to.

At block 704, the database server determines a corresponding IMU, $IMU_x$, based on the associated target snapshot time $t_T$. The database server may determine $IMU_x$ by determining which time period the target snapshot time $t_T$ falls into. That is, $IMU_x$ is the IMU that was current at the target snapshot time $t_T$. If no corresponding IMU is maintained in memory, then no IMU is used and the particular data item is obtained from another source (not shown).

At decision block 706, the database server determines whether IMU is the current IMU, $IMU_{current}$. If IMU is the current IMU, there is a possibility that the IMU is unavailable because $IMU_{current}$ is not complete (e.g. generation or repopulation has not finished). If the database server determines that $IMU_x$ is not the current IMU, processing continues to block 718, where the database server selects $SMU_x$ and $IMU_x$ to use to respond to the query.

Returning to decision block 706, if the database server determines that IMU is the current IMU, processing continues to decision block 708, where the database server determines whether $IMU_{current}$ is complete. If $IMU_{current}$ is complete, processing continues to block 718, where the database server determines that IMU and $SMU_x$ are used to respond to the request.

At decision block 720, the database server uses $SMU_x$ to determine whether the copy of the particular data item in IMU is stale. If the database server determines that the copy of the particular data item in $IMU_x$ is not stale, processing continues to block 722, where the database server obtains the copy of the particular data item from $IMU_x$. Returning to decision block 720, if the database server determines that the copy of the particular data item in IMU is stale, processing continues to block 716, where a copy of the particular data item is obtained from another source (e.g. persistent storage).

Returning to decision block 708, if the database server determines that $IMU_{current}$ is not complete, processing continues to block 710, where the database server selects the prior IMU $IMU_{x-1}$ to use to respond to the query. $SMU_x$ and $SMU_{x-1}$ are also selected because both SMUs are necessary to determine whether the copy of the particular data item in $IMU_{x-1}$ was stale at the target snapshot time $t_T$.

At decision block 712, the database server uses $SMU_{x-1}$ and $SMU_x$ to determine whether the copy of the particular data item in $IMU_{x-1}$ is stale. A data item is treated as stale if it is indicated to be stale in either $SMU_{x-1}$ or $SMU_x$. If the database server determines that the copy of the particular data item in $IMU_{x-1}$ is not stale, processing continues to block 714, where a copy of the particular data item is obtained from $IMU_{x-1}$. If the database server determines that the copy of the particular data item in $IMU_{x-1}$ is stale, processing continues to block 716, where a copy of the particular data item is obtained from another source (e.g. persistent storage).

At block 724, process 700 returns and/or terminates. For example, processing may continue to processing a successive data item, passing control to a calling process, generating any appropriate record or notification, returning after a method or function invocation, or terminating.

In some embodiments, the database server performs similar actions as shown in decision blocks 706-708 to determine whether $IMU_x$, the IMU corresponding to the target snapshot time $t_T$, is available. In some embodiments, the database server selects another prior $IMU_p$ other than the $IMU_{x-1}$ to use instead of $IMU_x$. In this case, a set of SMUs from $SMU_p$ to $SMU_x$ are used determine whether the particular data item is stale in $IMU_p$.

Version Retention

In some embodiments, one or more retention policies are implemented that determine a retention period for one or more IMUs of a mirrored-data-set. As used herein, the term "retention policy" refers to any rule, heuristic, or other guideline for determining whether one or more IMUs (e.g. IMUs) should be retained. When a retention policy indicates that an IMU should no longer be retained, the version is "expired."

Retention policies may be applied on a per-version basis for individual versions of a mirrored-data-set, a per-group basis for each mirrored-data-set, a per-structure basis for mirrored-data-sets belonging to a particular database structure (e.g. table, column, or other database structure), or a per-database basis for an entire database. Furthermore, different retention policies may be applied on different levels (per-version, per-group, per-structure, per-database, or another level).

One example of a retention policy is an in-memory-group size limitation. In this case, the number of IMUs maintained in memory for a particular mirrored-data-set is limited to the in-memory-group size. The in-memory-group size may be predetermined and/or dynamic, and may be based on one or more factors, such as but not limited to user preferences, frequency of updates, frequency of access, other staleness metrics, frequency of repopulation, other factors, or any combination thereof. When a new version is generated that would cause the number of IMUs to exceed the in-memory-group size, the oldest version in the in-memory-group is no longer retained in memory.

Another example of retention policies are time-based retention policies. For example, a retention period may be associated with a particular version, a particular mirrored-data-set (group of versions), a particular database structure, or the database system. An IMU expires after the retention period has elapsed with respect to a particular start time, which may be the version snapshot time, the next version snapshot time, a time that the version entered a particular state, or any other time.

Garbage Collection

In some embodiments, a garbage collection process ensures that the memory is reused only when a version is no longer required by any other process. As used herein, the term "release" refers to determining that an IMU will no longer be retained. As used herein, the term "released version" refers to an IMU that a database server has determined will no longer be retained in memory.

In some embodiments, one or more background processes periodically evaluate the IMUs for one or more mirrored-data-sets to check any retention policies that are applicable to the IMUs. When the one or more background processes determine that a particular IMU has expired, then the particular IMU is released.

Generally, when a version is released, the released version is made invisible to subsequent queries. The underlying memory becomes a candidate for reuse only when all existing queries (or processes executing the existing queries) have released their pins, latches, locks and/or other synchronization mechanisms on the released version. At this point, the memory corresponding to the released version may be deallocated and reused.

Memory Pressure

In some embodiments, the number of IMUs is reduced when a limiting condition is encountered, such as when memory pressure is detected. As used herein, the term "memory pressure" refers to a low memory condition, which may be detected based on one or more factors such as but not limited to a threshold, a percentage, or other factors.

When a limiting condition such as memory pressure is encountered, one or more IMUs may be released. In some embodiments, IMUs are candidates for release even if they are not yet expired according to any retention policy. In some embodiments, one or more factors are evaluated to determine which mirrored-data-sets are subject to release, such as but not limited to user preferences, an age of one or more IMUs, how severe the limiting condition is (e.g. how much memory is required), frequency of updates to the mirrored-data-set, frequency of access of the mirrored-data-set, other staleness metrics, frequency of repopulation, other factors, or any combination thereof. In some embodiments, all previous versions become candidates for garbage collection and reuse irrespective of retention expiration, leaving only a single current IMU for one or more mirrored-data-sets.

Example Processes for Memory Management

Figure 8:
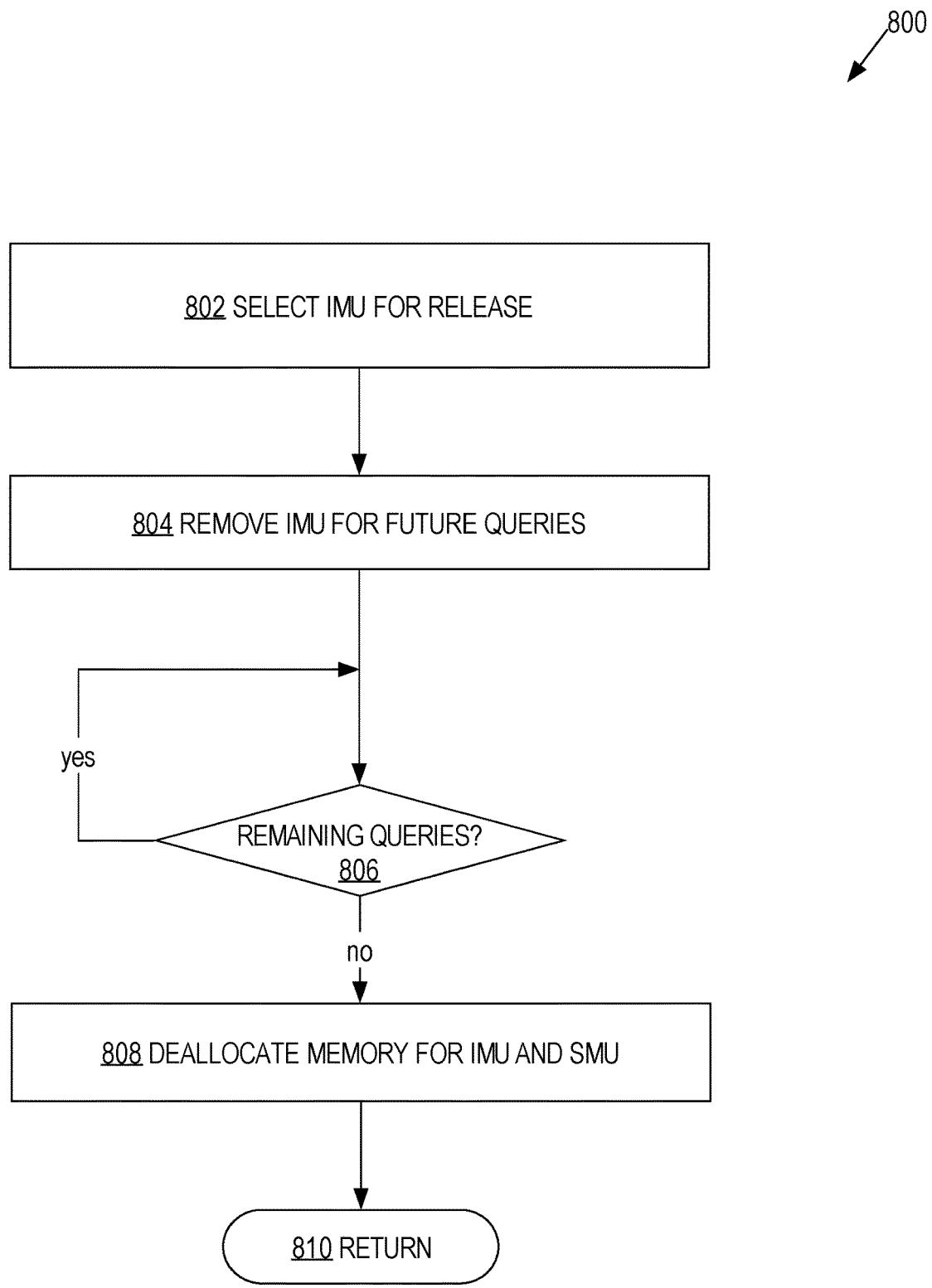
FIG. 8 is a flow diagram illustrating a process for removing an in-memory data set from a set of available in-memory data sets, according to an embodiment.

FIG. 8 is a flow diagram illustrating a process for removing an IMU from a set of available IMUs, according to an embodiment. Process 800 may be performed by one or more computing devices and/or processes thereof. For example, one or more blocks of process 800 may be performed by computing device 900. In some embodiments, one or more blocks of process 800 are performed by a database server, such as database server 120.

At decision block 802, the database server selects a particular IMU for release. For example, the IMU may be selected for release when the database server determines that the IMU has expired, according to a retention policy. In some embodiments, the IMU is selected for release when a limiting condition is detected, such as a low memory condition.

At block 804, the database server makes the IMU unavailable for use when processing subsequent queries. In some embodiments, the IMU is made unavailable by removing a reference to the IMU from data that maps the mirrored-data-set to an in-memory-group of IMUs.

At decision block 806, the database server determines whether any active queries remain that are still using the released IMU. For example, a garbage collection process may check to see whether all existing queries (or processes executing the existing queries) have released their pins, latches, locks and/or other synchronization mechanisms on the released IMU. In some embodiments, the garbage collection process periodically performs this check for a set of released IMUs. When the database server determines that no more queries may potentially access the released IMU, processing continues to block 808.

At block 808, the database server deallocates the memory for the IMU and the corresponding SMU.

At block 810, process 800 returns and/or terminates. For example, processing may continue to processing a successive data item, passing control to a calling process, generating any appropriate record or notification, returning after a method or function invocation, or terminating.

Effect on Workloads

The techniques described herein guarantee a high availability of in-memory data (e.g. IMUs or other IMUs), even when the in-memory data is being repopulated due to updates (e.g. DML activity). Analytic queries in a mixed OLTP environment therefore reap the benefits of in-memory columnar format optimization perpetually without having to fall back to underlying storage.

The impact of increased availability is particular visible when multiple concurrent queries access the IMUs undergoing repopulation. Without these techniques, concurrent queries have to contend for the underlying storage resources at a given time. Workload throughput regression therefore gets multiplied proportionally to the number of queries. With the techniques described herein, the improved throughput for a single query scales with the number of concurrent queries in the system. Regression in throughput of greater than two orders of magnitude have been observed under high concurrent scan workload when IMUs are not available due to repopulation. On the other hand, with the availability of IMUs, query throughput scales linearly.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
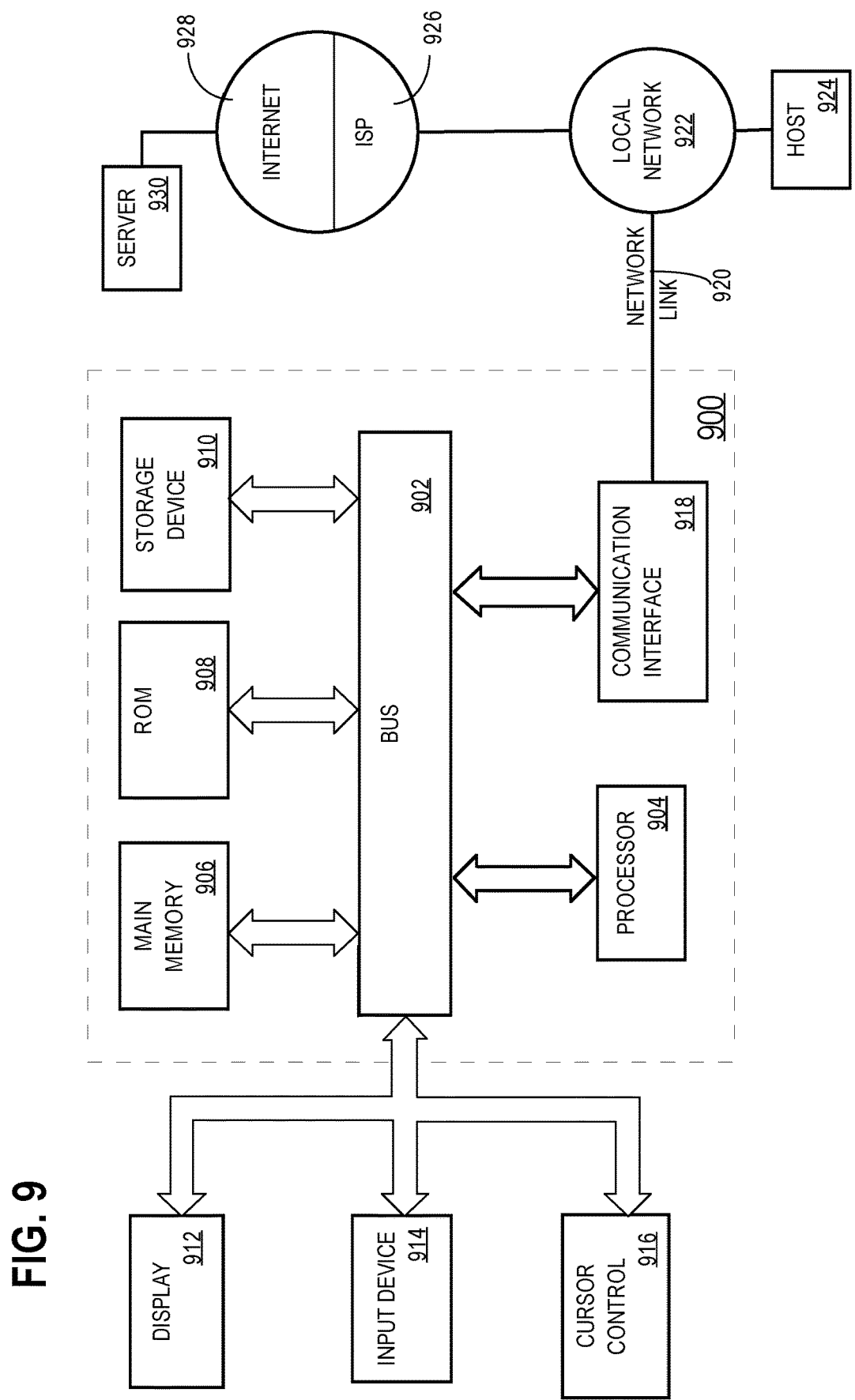
FIG. 9 is a block diagram illustrating a computer system that may be used to implement the techniques described herein.

For example, FIG. 9 is a block diagram illustrating a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to some embodiments, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
maintaining, in persistent storage, a database that is accessible to a database server;
wherein the database includes a persistent copy, in a persistent format, of each data item in a mirrored-data-set;
the database server generating and maintaining, in volatile memory, a first IMU comprising a copy of each data item in the mirrored-data-set, each copy reflecting changes made to the data item up to a first snapshot time;
during a first period from the first snapshot time to a second snapshot time that is later than the first snapshot time, the database server responding to updates to first data items in the mirrored-data-set by:
changing persistent-format copies of the first data items without updating copies of the first data items in the first IMU; and
storing first staleness metadata that indicates that the copies of the first data items in the first IMU are stale;
the database server generating and maintaining, in volatile memory, a second IMU comprising a copy of each data item in the mirrored-data-set, each copy reflecting changes made to the data item up to the second snapshot time;
wherein, within the first IMU and the second IMU, data items are stored in a different format than the persistent format;
during a second period that begins at the second snapshot time, the database server responding to updates to second data items in the mirrored-data-set by:
changing persistent-format copies of the second data items without updating copies of the second data items in the second IMU; and
storing second staleness metadata that indicates that the copies of the second data items in the second IMU are stale;
while the database server is maintaining both the first IMU and the second IMU, the database server:
receiving a request that requires access to a particular data item in the mirrored-data-set;
responding to the request by selecting an IMU from an in-memory group for the mirrored-data-set that includes the first IMU and the second IMU based on a target snapshot time associated with the request; and
obtaining at least some data items from the selected IMU to generate a response to the request;
wherein the method is performed by one or more computing devices.

2. The method of claim 1, wherein the database server responding to the request comprises:
when the target snapshot time associated with the request is between the first snapshot time and the second snapshot time, the database server selecting the first IMU;
based on the first staleness metadata, the database server determining whether the copy of the particular data item in the first IMU is stale;
when it is determined that the copy of the particular data item in the first IMU is not stale, accessing the first IMU to retrieve the particular data item.

3. The method of claim 1,
wherein generating the second IMU ends at a completion time;
wherein the database server responding to the request comprises:
when the target snapshot time associated with the request is between the second snapshot time and the completion time, the database server selecting the first IMU;
based on the first staleness metadata and the second staleness metadata, the database server determining whether the copy of the particular data item in the first IMU is stale;
when it is determined that the copy of the particular data item in the first IMU is not stale, accessing the first IMU to retrieve the particular data item.

4. The method of claim 1,
wherein generating the second IMU ends at a completion time;
wherein the database server responding to the request comprises:
when the target snapshot time associated with the request is after the completion time, the database server selecting the second IMU;
based on the second staleness metadata, the database server determining whether the copy of the particular data item in the second IMU is stale;
when it is determined that the copy of the particular data item in the second IMU is not stale, accessing the second IMU to retrieve the particular data item.

5. The method of claim 1, wherein the first IMU and the second IMU are stored in a column-major format and the persistent copies are stored in a persistent data set in a row-major format.

6. The method of claim 5, further comprising, when it is determined that the particular data item is stale in a selected IMU selected from the first IMU and the second IMU, the database server retrieving the particular data item by accessing a persistent data block in the row-major format or a cached version of the persistent data block in the row-major format.

7. The method of claim 1, wherein generating the second IMU comprises:
based on the first staleness metadata, identifying a set of valid data items of the first IMU that are not stale at the second snapshot time;
populating a first portion of the second IMU based on the set of valid data items of the first IMU that are not stale;
populating a second portion of the second IMU by accessing copies, from another source other than the first IMU, of data items of the first IMU that are stale.

8. The method of claim 1, further comprising:
the database server generating and maintaining, in volatile memory, a set of IMUs that includes the first IMU and the second IMU;
wherein, each IMU of the set of IMUs is generated between a respective version start snapshot time and a respective version completion time;
during each period that begins at a version start snapshot time corresponding to a particular IMU and ends at a version start snapshot time of a next IMU, the database server responding to updates to data items in the mirrored-data-set by:
changing persistent copies of the data items without updating copies of the data items in the particular IMU; and storing a staleness metadata for the particular IMU that indicates that the copies of the data items in the particular IMU are stale.

9. The method of claim 8, further comprising:
while the database server is maintaining the set of IMUs, the database server receiving a second request that requires access to a second particular data item;
based on the target snapshot time of the request, the database server determining a current IMU from the set of IMUs, wherein the target snapshot time is between a version start snapshot time of the current IMU and a version end snapshot time of the current IMU;
the database server responding to the second request by accessing the current IMU, an immediate prior IMU, or a persistent copy of the second particular data item;
wherein when the target snapshot time is before a version completion time of the current IMU, the database server retrieves the second particular data item from the immediate prior IMU when the copy of the second particular data item in the immediate prior IMU is not stale based on staleness metadata of the immediate prior IMU and staleness metadata of the current IMU;
wherein when the target snapshot time is after a version completion time of the current IMU, the database server retrieves the second particular data item from the current IMU when the copy of the second particular data item in the current IMU is not stale based on staleness metadata of the current IMU.

10. The method of claim 8,
wherein a number of versions in the set of IMUs is limited to a particular size,
further comprising removing, from volatile memory, an earliest IMU in the set of IMUs when a new IMU is generated that causes the particular size to be exceeded.

11. The method of claim 8, further comprising removing, from volatile memory, one or more IMUs from the set of IMUs when a memory pressure condition is detected.

12. The method of claim 1, wherein during the second period that begins at the second snapshot time, the database server responding to updates to second data items in the mirrored-data-set includes the database server responding to updates without making any further updates to the first staleness metadata.

13. The method of claim 1, wherein the format in which data items are stored within the first IMU and the second IMU is a compressed format.

14. One or more non-transitory computer-readable media storing instructions, wherein the instructions include:
instructions which, when executed by one or more hardware processors, cause maintaining, in persistent storage, a database that is accessible to a database server;
wherein the database includes a persistent copy, in a persistent format, of each data item in a mirrored-data-set;
instructions which, when executed by one or more hardware processors, cause the database server generating and maintaining, in volatile memory, a first IMU comprising a copy of each data item in the mirrored-data-set, each copy reflecting changes made to the data item up to a first snapshot time;
instructions which, when executed by one or more hardware processors, cause, during a first period from the first snapshot time to a second snapshot time that is later than the first snapshot time, the database server responding to updates to first data items in the mirrored-data-set by:
changing persistent copies of the first data items without updating copies of the first data items in the first IMU; and
storing first staleness metadata that indicates that the copies of the first data items in the first IMU are stale;
instructions which, when executed by one or more hardware processors, cause the database server generating and maintaining, in volatile memory, a second IMU comprising a copy of each data item in the mirrored-data-set, each copy reflecting changes made to the data item up to the second snapshot time;
wherein, within the first IMU and the second IMU, data items are stored in a different format than the persistent format;
instructions which, when executed by one or more hardware processors, cause, during a second period that begins at the second time snapshot time, the database server responding to updates to second data items in the mirrored-data-set by:
changing persistent copies of the second data items without updating copies of the second data items in the second IMU; and
storing second staleness metadata that indicates that the copies of the second data items in the second IMU are stale;
instructions which, when executed by one or more hardware processors, cause, while the database server is maintaining both the first IMU and the second IMU, the database server receiving a request that requires access to a particular data item in the mirrored-data-set, responding to the request by selecting, based on a target snapshot time associated with the request, an IMU from an in-memory group for the mirrored-data-set that includes the first IMU and the second IMU, and obtaining at least some data items from the selected IMU to generate a response to the request.

15. The non-transitory computer-readable media of claim 14, wherein the database server responding to the request comprises:
when the target snapshot time associated with the request is between the first snapshot time and the second snapshot time, the database server selecting the first IMU;
based on the first staleness metadata, the database server determining whether the copy of the particular data item in the first IMU is stale;
when it is determined that the copy of the particular data item in the first IMU is not stale, accessing the first IMU to retrieve the particular data item.

16. The non-transitory computer-readable media of claim 14,
wherein generating the second IMU ends at a completion time;
wherein the database server responding to the request comprises:
when the target snapshot time associated with the request is between the second snapshot time and the completion time, the database server selecting the first IMU;
based on the first staleness metadata and the second staleness metadata, the database server determining whether the copy of the particular data item in the first IMU is stale;
when it is determined that the copy of the particular data item in the first IMU is not stale, accessing the first IMU to retrieve the particular data item.

17. The non-transitory computer-readable media of claim 14,
wherein generating the second IMU ends at a completion time;
wherein the database server responding to the request comprises:
when the target snapshot time associated with the request is after the completion time, the database server selecting the second IMU;
based on the second staleness metadata, the database server determining whether the copy of the particular data item in the second IMU is stale;
when it is determined that the copy of the particular data item in the second IMU is not stale, accessing the second IMU to retrieve the particular data item.

18. The non-transitory computer-readable media of claim 14, wherein the first IMU and the second IMU are stored in a column-major format and the persistent copies are stored in a persistent data set in a row-major format.

19. The non-transitory computer-readable media of claim 18, wherein the instructions include instructions which, when executed by one or more hardware processors, cause, when it is determined that the particular data item is stale in a selected IMU selected from the first IMU and the second IMU, the database server retrieving the particular data item by accessing a persistent data block in the row-major format or a cached version of the persistent data block in the row-major format.

20. The non-transitory computer-readable media of claim 14, wherein generating the second IMU comprises:
based on the first staleness metadata, identifying a set of valid data items of the first IMU that are not stale at the second snapshot time;
populating a first portion of the second IMU based on the set of valid data items of the first IMU that are not stale;
populating a second portion of the second IMU by accessing copies, from another source other than the first IMU, of data items of the first IMU that are stale.

21. The non-transitory computer-readable media of claim 14, wherein the instructions include:
instructions which, when executed by one or more hardware processors, cause the database server generating and maintaining, in volatile memory, a set of IMUs that includes the first IMU and the second IMU;
wherein, each IMU of the set of IMUs is generated between a respective version start snapshot time and a respective version completion time;
instructions which, when executed by one or more hardware processors, cause, during each period that begins at a version start snapshot time corresponding to a particular IMU and ends at a version start snapshot time of a next IMU, the database server responding to updates to data items in the mirrored-data-set by:
changing persistent copies of the data items without updating copies of the data items in the particular IMU; and
storing a staleness metadata for the particular IMU that indicates that the copies of the data items in the particular IMU are stale.

22. The non-transitory computer-readable media of claim 21, wherein the instructions include:
instructions which, when executed by one or more hardware processors, cause, while the database server is maintaining the set of IMUs, the database server receiving a second request that requires access to a second particular data item;
instructions which, when executed by one or more hardware processors, cause, based on the target snapshot time of the request, the database server determining a current IMU from the set of IMUs, wherein the target snapshot time is between a version start snapshot time of the current IMU and version end snapshot time of the current IMU;
instructions which, when executed by one or more hardware processors, cause the database server responding to the second request by accessing the current IMU, an immediate prior IMU, or a persistent copy of the second particular data item;
wherein when the target snapshot time is before a version completion time of the current IMU, the database server retrieves the second particular data item from the immediate prior IMU when the copy of the second particular data item in the immediate prior IMU is not stale based on staleness metadata of the immediate prior IMU and staleness metadata of the current IMU;
wherein when the target snapshot time is after a version completion time of the current IMU, the database server retrieves the second particular data item from the current IMU when the copy of the second particular data item in the current IMU is not stale based on staleness metadata of the current IMU.

23. The non-transitory computer-readable media of claim 21,
wherein a number of versions in the set of IMUs is limited to a particular size,
wherein the instructions include instructions which, when executed by one or more hardware processors, cause removing, from volatile memory, an earliest IMU in the set of IMUs when a new IMU is generated that causes the particular size to be exceeded.

24. The non-transitory computer-readable media of claim 21, wherein the instructions include instructions which, when executed by one or more hardware processors, cause removing, from volatile memory, one or more IMUs from the set of IMUs when a memory pressure condition is detected.

25. The non-transitory computer-readable media of claim 14, wherein during the second period that begins at the second snapshot time, the database server responding to updates to second data items in the mirrored-data-set includes the database server responding to updates without making any further updates to the first staleness metadata.

26. The non-transitory computer-readable media of claim 14, wherein the format in which data items are stored within the first IMU and the second IMU is a compressed format.

* * * * *

UNITED STATES PATENT AND TRADEMARK OFFICE
CERTIFICATE OF CORRECTION

PATENT NO. : 10,572,469 B2
APPLICATION NO. : 15/169013
DATED : February 25, 2020
INVENTOR(S) : Mullick et al.

Page 1 of 1

It is certified that error appears in the above-identified patent and that said Letters Patent is hereby corrected as shown below:

In the Specification

In Column 19, Line 50, delete "SMUT." and insert -- $SMU_1$. --, therefor.

In Column 20, Line 6, delete "t current" and insert -- $t_{current}$ --, therefor.

In the Claims

In Column 32, Line 14, in Claim 22, after "and" insert -- a --.

Signed and Sealed this
Tenth Day of November, 2020

Andrei Iancu
*Director of the United States Patent and Trademark Office*